US012610317B2

(12) United States Patent
Maamari et al.

(10) Patent No.: US 12,610,317 B2
(45) Date of Patent: Apr. 21, 2026

(54) MULTI-PDSCH AND MULTI-PUSCH TRANSMISSION ENHANCEMENTS

(71) Applicant: QUALCOMM Incorporated, San Diego, CA (US)

(72) Inventors: Diana Maamari, San Diego, CA (US); Prashanth Haridas Hande, San Diego, CA (US); Mickael Mondet, Louannec (FR); Peerapol Tinnakornsrisuphap, San Diego, CA (US); Hyun Yong Lee, San Diego, CA (US); Ovidiu Constantin Iacoboaiea, Chatillon (FR)

(73) Assignee: QUALCOMM Incorporated, San Diego, CA (US)

( * ) Notice: Subject to any disclaimer, the term of this patent is extended or adjusted under 35 U.S.C. 154(b) by 654 days.

(21) Appl. No.: 17/657,735

(22) Filed: Apr. 1, 2022

(65) Prior Publication Data

US 2023/0319717 A1    Oct. 5, 2023

(51) Int. Cl.
*H04W 52/02* (2009.01)
(52) U.S. Cl.
CPC .............................. *H04W 52/0235* (2013.01)
(58) Field of Classification Search
CPC ........................... H04W 52/0235; Y02D 30/70
USPC ......... 370/311; 455/127.5, 343.1–343.5, 574
See application file for complete search history.

(56) References Cited

U.S. PATENT DOCUMENTS

| | | | |
|---|---|---|---|
| 8,837,515 B1 * | 9/2014 | Cai ................... | H04W 74/0825 |
| | | | 370/445 |
| 2020/0059906 A1 * | 2/2020 | Gupta ................... | H04W 28/06 |
| 2020/0221306 A1 * | 7/2020 | Chen ..................... | H04W 16/14 |
| 2021/0014002 A1 * | 1/2021 | Lovlekar ............... | H04W 72/20 |
| 2021/0320760 A1 * | 10/2021 | Rastegardoost ...... | H04L 1/1854 |
| 2021/0345393 A1 * | 11/2021 | Xue ................... | H04W 52/0216 |

* cited by examiner

*Primary Examiner* — Michael Y Mapa
(74) *Attorney, Agent, or Firm* — Norton Rose Fulbright US LLP

(57) ABSTRACT

This disclosure provides systems, methods, and devices for wireless communication that support enhanced burst transmission operations. In a first aspect, a method of wireless communication includes receiving, by a wireless communication device, a signaling message indicating a burst transmission, the burst transmission including one or more sets of physical downlink shared channel (PDSCH) or physical uplink shared channel (PUSCH) transmissions. The method also includes transmitting or receiving, by the wireless communication device, at least one set of PDSCH or PUSCH transmissions of the one or more sets of PDSCH or PUSCH transmissions of the burst transmission based on the signaling message. The method further includes transitioning, by the wireless communication device, to a power saving mode based on the signaling message. Other aspects and features are also claimed and described.

30 Claims, 11 Drawing Sheets

900

Receive a signaling message indicating a burst transmission, the burst transmission including one or more sets of PDSCH or PUSCH transmissions.

901

Transmit or receive at least one set of PDSCH or PUSCH transmissions of the one or more sets of PDSCH or PUSCH transmissions of the burst transmission based on the signaling message.

902

Transition to a power saving mode based on the signaling message.

800

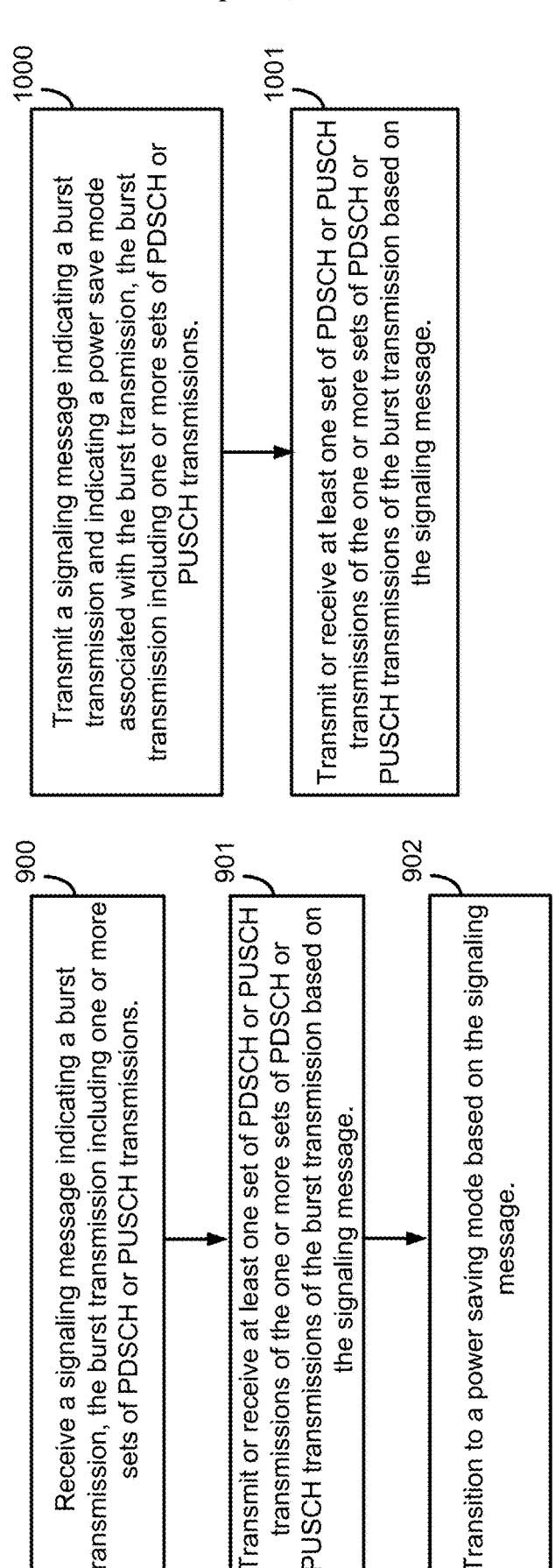

1000

Transmit a signaling message indicating a burst transmission and indicating a power save mode associated with the burst transmission, the burst transmission including one or more sets of PDSCH or PUSCH transmissions.

1001

Transmit or receive at least one set of PDSCH or PUSCH transmissions of the one or more sets of PDSCH or PUSCH transmissions of the burst transmission based on the signaling message.

Receive a signaling message indicating a burst transmission, the burst transmission including one or more sets of PDSCH or PUSCH transmissions.

901

Transmit or receive at least one set of PDSCH or PUSCH transmissions of the one or more sets of PDSCH or PUSCH transmissions of the burst transmission based on the signaling message.

902

Transition to a power saving mode based on the signaling message.

FIG. 9

MULTI-PDSCH AND MULTI-PUSCH TRANSMISSION ENHANCEMENTS

TECHNICAL FIELD

Aspects of the present disclosure relate generally to wireless communication systems, and more particularly, to burst transmissions. Some features may enable and provide improved communications, including improved throughput and power savings.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes receiving, by a wireless communication device, a signaling message indicating a burst transmission, the burst transmission including one or more sets of physical downlink shared channel (PDSCH) or physical uplink shared channel (PUSCH) transmissions. The method also includes transmitting or receiving, by the wireless communication device, at least one set of PDSCH or PUSCH transmissions of the one or more sets of PDSCH or PUSCH transmissions of the burst transmission based on the signaling message. The method further includes transitioning, by the wireless communication device, to a power saving mode based on the signaling message.

In an additional aspect of the disclosure, an apparatus includes at least one processor and a memory coupled to the at least one processor. The at least one processor is configured to receive a signaling message indicating a burst transmission, the burst transmission including one or more sets of PDSCH or PUSCH transmissions. The at least one processor is also configured to transmit or receive at least one set of PDSCH or PUSCH transmissions of the one or more sets of PDSCH or PUSCH transmissions of the burst transmission based on the signaling message. The at least one processor is further configured to transition to a power saving mode based on the signaling message.

In an additional aspect of the disclosure, an apparatus includes means for receiving a signaling message indicating a burst transmission, the burst transmission including one or more sets of PDSCH or PUSCH transmissions. The apparatus also includes means for transmitting or receiving at least one set of PDSCH or PUSCH transmissions of the one or more sets of PDSCH or PUSCH transmissions of the burst transmission based on the signaling message. The apparatus further includes means for includes transitioning to a power saving mode based on the signaling message.

In an additional aspect of the disclosure, a non-transitory computer-readable medium stores instructions that, when executed by a processor, cause the processor to perform operations. The operations include receiving a signaling message indicating a burst transmission, the burst transmission including one or more sets of PDSCH or PUSCH transmissions; transmitting or receiving at least one set of PDSCH or PUSCH transmissions of the one or more sets of PDSCH or PUSCH transmissions of the burst transmission based on the signaling message; and transitioning to a power saving mode based on the signaling message.

In another aspect, a method of wireless communication includes transmitting, by a wireless communication device, a signaling message indicating a burst transmission and indicating a power save mode associated with the burst transmission, the burst transmission including one or more sets of PDSCH or PUSCH transmissions. The method further includes transmitting or receiving, by the wireless communication device, at least one set of PDSCH or PUSCH transmissions of the one or more sets of PDSCH or PUSCH transmissions of the burst transmission based on the signaling message.

In an additional aspect of the disclosure, an apparatus includes at least one processor and a memory coupled to the at least one processor. The at least one processor is configured to transmit a signaling message indicating a burst transmission and indicating a power save mode associated with the burst transmission, the burst transmission including one or more sets of PDSCH or PUSCH transmissions. The at least one processor is further configured to transmit or receive at least one set of PDSCH or PUSCH transmissions of the one or more sets of PDSCH or PUSCH transmissions of the burst transmission based on the signaling message.

In an additional aspect of the disclosure, an apparatus includes means for transmitting a signaling message indicating a burst transmission and indicating a power save mode associated with the burst transmission, the burst transmission including one or more sets of PDSCH or PUSCH transmissions. The apparatus further includes means for transmitting or receiving at least one set of PDSCH or PUSCH transmissions of the one or more sets of PDSCH or PUSCH transmissions of the burst transmission based on the signaling message.

In an additional aspect of the disclosure, a non-transitory computer-readable medium stores instructions that, when executed by a processor, cause the processor to perform operations. The operations include transmitting a signaling message indicating a burst transmission and indicating a power save mode associated with the burst transmission, the burst transmission including one or more sets of PDSCH or PUSCH transmissions; and transmitting or receiving at least one set of PDSCH or PUSCH transmissions of the one or more sets of PDSCH or PUSCH transmissions of the burst transmission based on the signaling message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9 is a flow diagram illustrating an example process that supports enhanced burst transmission operations according to one or more aspects.

FIG. 10 is a flow diagram illustrating another example process that supports enhanced burst transmission operations according to one or more aspects.

Like reference numbers and designations in the various drawings indicate like elements.

DETAILED DESCRIPTION

Figure 1:
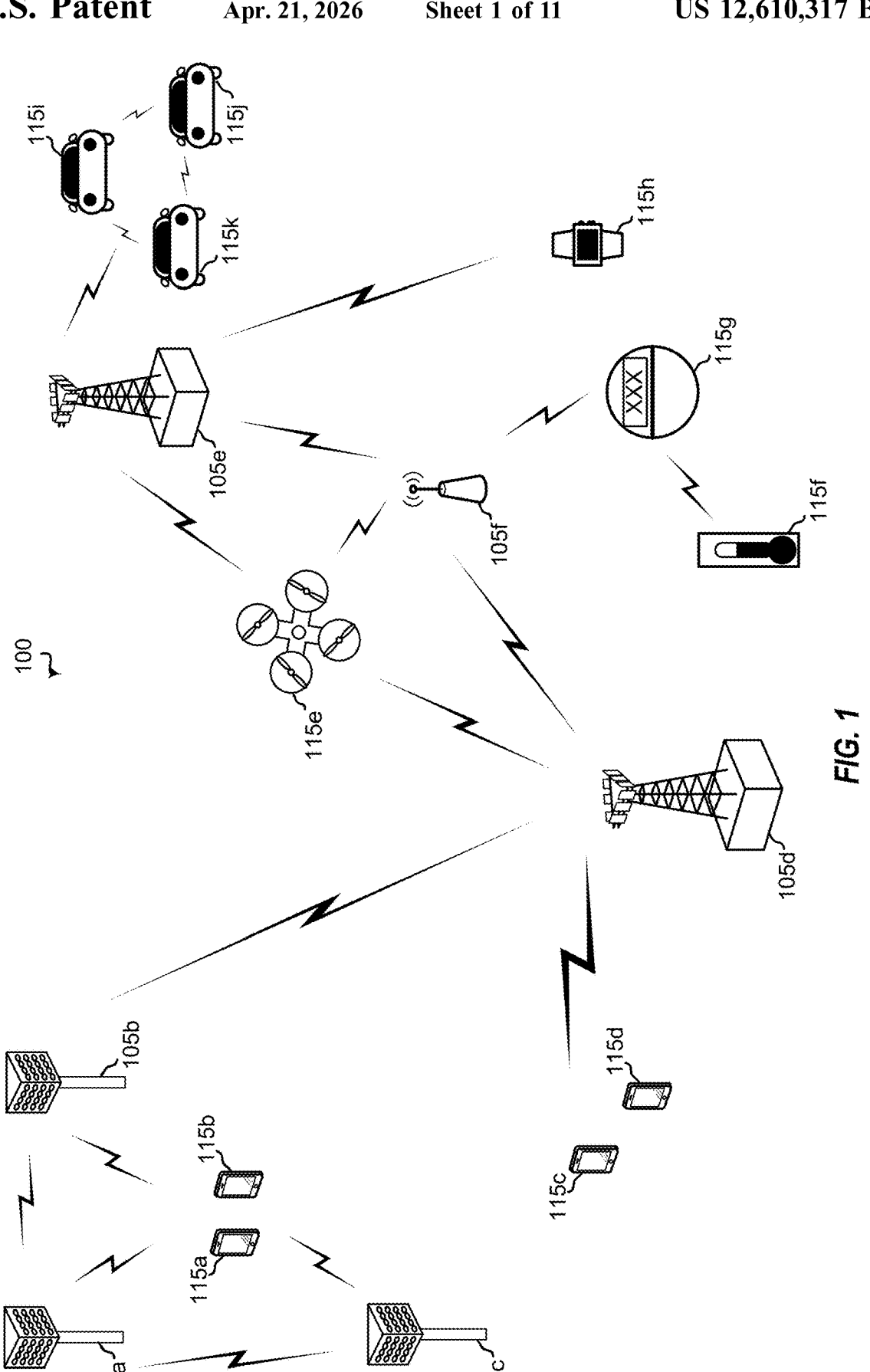
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., −0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of sub-carrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
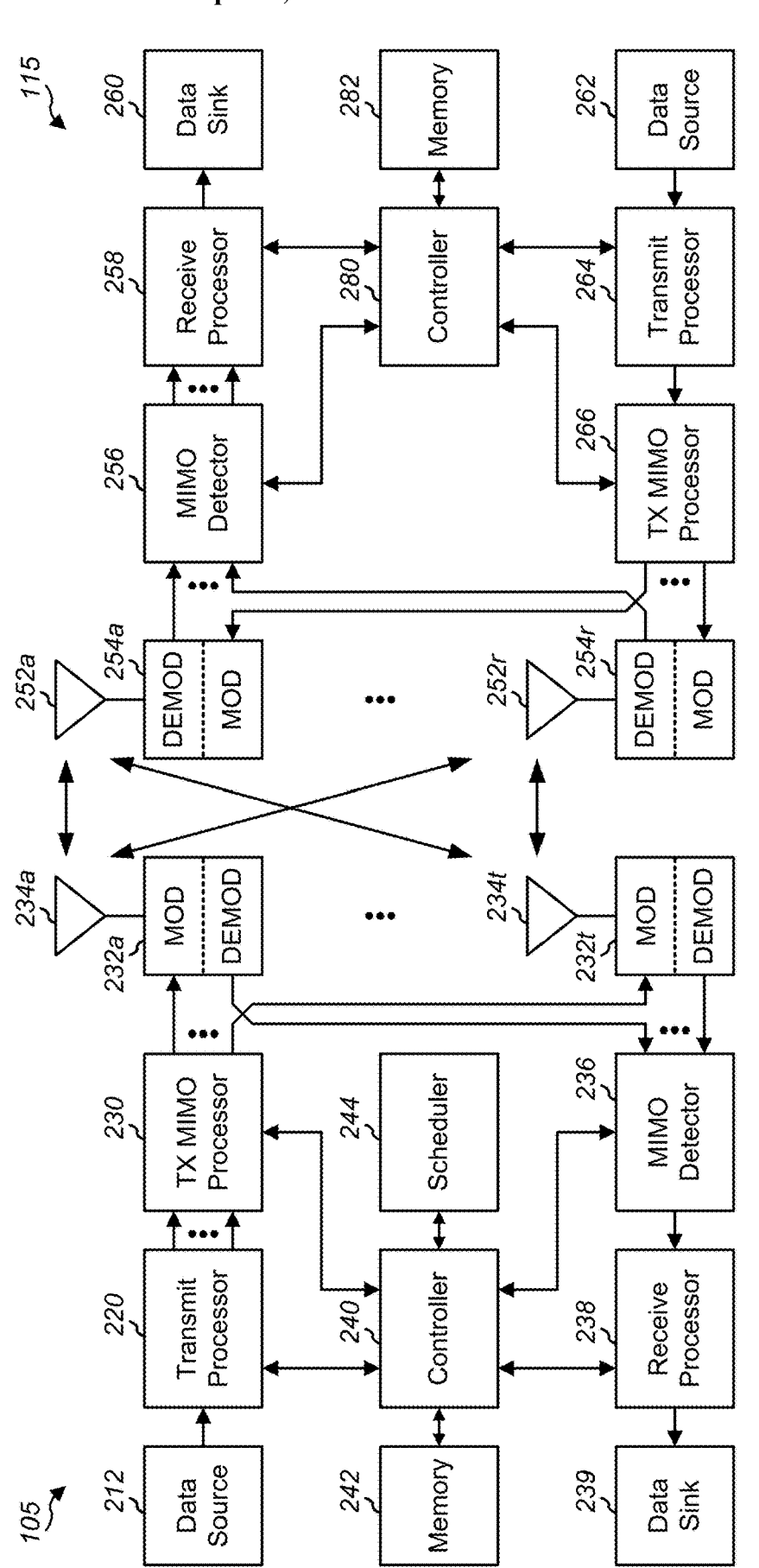
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 9 and 10, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Extended reality (XR) stands for "reality-plus" and is an umbrella term that covers virtual reality (VR), augmented reality (AR), and mixed reality (MR). XR traffic is traffic which supports XR applications or operating modes. XR use cases have traffic requirements that are high in throughput, such as in Enhanced Mobile Broadband (eMBB), low in latency, and high in reliability, such as in Ultra-Reliable Low Latency Communications (uRLLC), and low in power consumption, such as in NR Light (e.g., smart wearables and sensing applications). 5G is widely referred to as the lifeblood of the future of XR industries and their developing products as it has the potential for such extreme operating requirements and scenarios. However, further enhancements are needed to enable further development and operation of XR.

One such technique in providing XR traffic, is multiple transmission, referred to as multi-PUSCH transmission for uplink and multi-PDSCH transmission for downlink. Multi-PUSCH transmission has been proposed for NR-U. This proposal involves using a single downlink control information (DCI) of format 0_1 to schedule up to 8 consecutive PUSCH transmissions. Similarity, multi-PDSCH transmission has been proposed for high frequency NR (e.g., NR 52.6 GHz to 71 GHz). This proposal involves using a single DCI of format 0_1 to schedule up to 8 consecutive PDSCH transmissions. These multiple PUSCH/PDSCH transmissions are often referred to as a burst transmission.

Figures 3A, 3B:
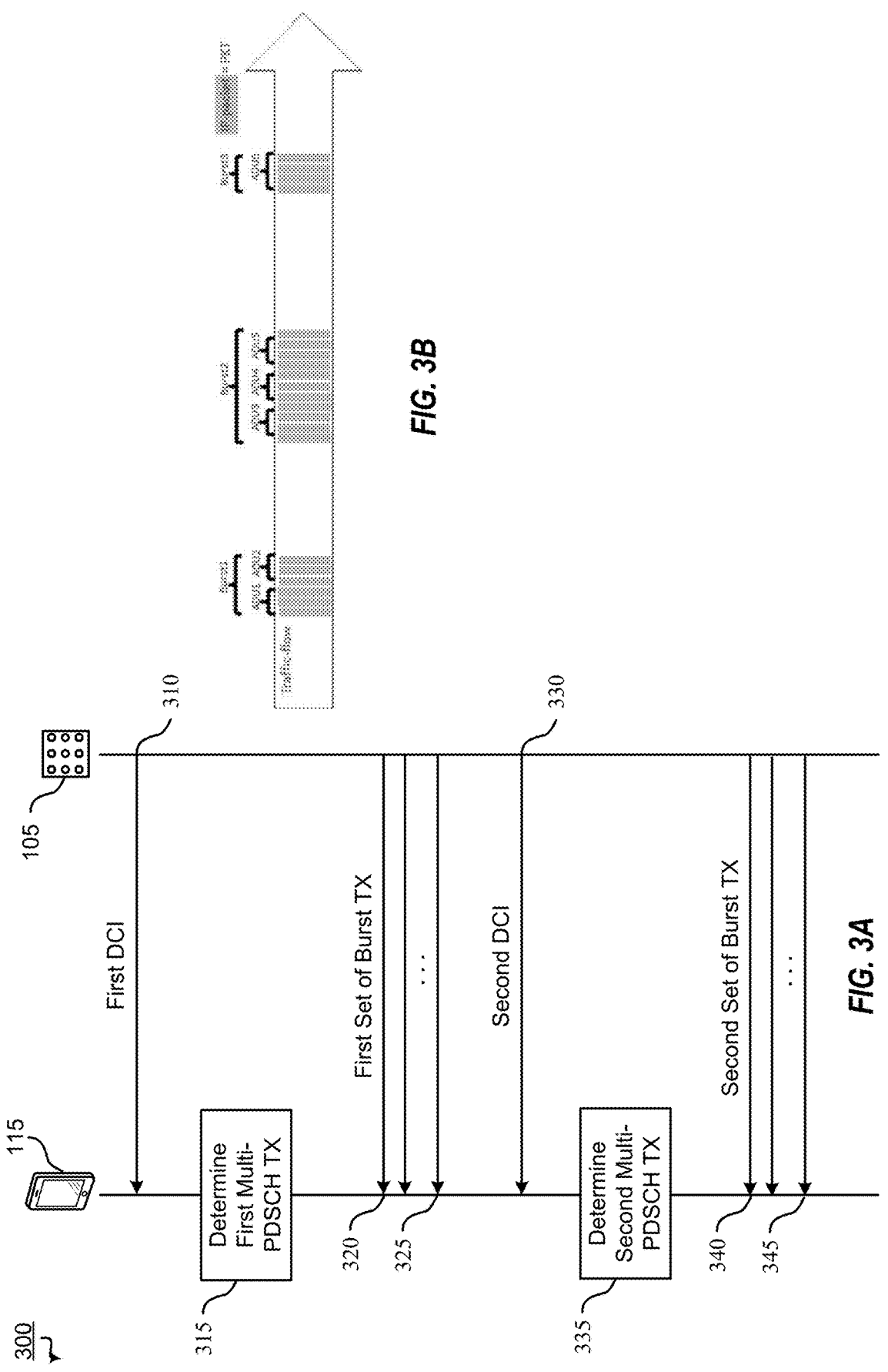
FIG. 3A is a timing diagram illustrating an example wireless communication system that supports multiple PDSCH/PUSCH operations according to one or more aspects.
FIG. 3B is a timing diagram illustrating an example traffic flow for Extended Reality (XR) applications.

However, XR traffic flow has been predicted (as shown in FIG. 3B) to require more bandwidth than available with the currently supported burst transmission of 8 consecutive PUSCH or PDSCH. As illustrated in FIG. 3B, XR traffic flow may include one or more application data units (ADUs) as opposed to one or more packet data units (PDUs) as XR applications consume more data. An ADU is often referred to as a PDU set, which is composed of one or more PDUs carrying the payload of one unit of information generated at the application level (e.g., a frame or video slice for XR media (XRM) Services). Alternatively, an ADU or PDU set may be referred to as an XRM unit and is larger than a PDU in granularity. A burst transmission as used herein may include one or more ADUs or sets of PDUs. Transmitting the burst of one or more ADUs may provide lower latency and increased throughput for the provision of XR services.

Currently, there are no available solutions that can support such a traffic flow efficiently, such as with low signaling overhead, low latency, and high throughput. Additionally, no current burst transmission proposal takes into account or provides for power savings.

FIG. 3A is a timing diagram of an example wireless communications system that supports multiple PDSCH operations. Referring to FIG. 3A, FIG. 3A is a diagram 300 of conventional multiple PDSCH operations. In FIG. 3A, a base station 105 and UE 115 engage in conventional multiple PDSCH transmissions. Each multiple PDSCH transmissions is scheduled by a corresponding DCI and includes 2-8 PDSCHs. The DCI includes a four bit field to indicate a number of transmissions (2-8 PDSCH transmissions) of the multiple PDSCH transmission.

At 310, the base station 105 transmits a first DCI to the UE 115 which indicates a first multi-PDSCH transmission. The first DCI indicates and schedules a number of PDSCHs (e.g., the maximum number, such as 8) of the first multi-PDSCH transmission.

At 315, the UE 115 receives and decodes the first DCI. The UE 115 may decode the first DCI to determine the multi-PDSCH transmission and a schedule therefore.

From 320 to 325, the base station 105 transmits the first multi-PDSCH transmission. For example, the base station 105 transmits a first set of PDSCH transmissions (e.g., 8 PDSCHs) to the UE 115 based on the indication in the first DCI.

The UE 115 may receive and decode the first multi-PDSCH transmission. For example, the UE 115 may monitor resources associated with the first multi-PDSCH transmission based on the first DCI which scheduled the set of PDSCHs of the first multi-PDSCH transmission. The UE 115 may successful receive and decode each PDSCH transmission of the set.

At or after 325, the UE 115 operates according to a CDRX mode. For example, based on timers and settings of the CDRX mode, the UE 115 may determine to stay awake until a next transmission (e.g., second DCI at 330) or may determine to go to sleep sometime after an end of the first multi-PDSCH transmission based on expiration of a timer (e.g., inactivity timer).

At 330, the base station 105 transmits a second DCI to the UE 115 which indicates a second multi-PDSCH transmission. The second DCI indicates and schedules a number of PDSCHs of the second multi-PDSCH transmission. The second multi-PDSCH transmission is distinct from the first multi-PDSCH transmission, has separate signaling and may include different data.

The UE 115 receives and decodes the second DCI. The UE 115 may decode the second DCI to determine the amount of PDSCHs in the second multi-PDSCH transmission at 335.

From 340 to 345, the base station 105 transmits the second multi-PDSCH transmission. For example, the base station 105 transmits a second set of PDSCH transmissions (e.g., 6 PDSCHs) of the second multi-PDSCH transmission to the UE 115 based on the indication in the second DCI.

The UE 115 may receive and decode the second multi-PDSCH transmission. For example, the UE 115 may monitor resources associated with the second multi-PDSCH transmission based on the second DCI which scheduled the set of PDSCH transmissions of the second multi-PDSCH transmission. The UE 115 may successful receive and decode each PDSCH transmission of the second multi-PDSCH transmission.

At or after 345, the UE 115 operates according to a Connected Mode Discontinuous Reception (DRX) or a CDRX mode. For example, based on timers and settings of the CDRX mode, the UE 115 may determine to stay awake until a next transmission (e.g., third DCI after 345) or may determine to go to sleep sometime after an end of the second multi-PDSCH transmission based on expiration of a timer (e.g., inactivity timer).

Thus, in the example in FIG. 3A, the wireless communication devices perform multiple PDSCH (or PUSCH) transmissions scheduled by a corresponding DCI which indicates the multiple transmission and amount of transmission in the multiple transmission (i.e., a single set multi-transmission). The DCI does not indicate a burst transmission or any additional sets of transmissions. Additionally, the DCI does not indicate any power mode information, such as power savings operations) for the multi-transmission. Accordingly, the current multiple transmission operations can utilize enhancements for scheduling additional sets and for power savings information to support new traffic patterns, such as traffic patterns for 5G and XR, as described further with reference to FIG. 3B.

FIG. 3B is a timing diagram of an example of XR traffic. In FIG. 3B, three burst transmissions are illustrated. A first burst includes two ADUs (ADU1 and ADU2), a second burst include three ADUs (ADU3, ADU4, and ADU5), and a third burst include one ADU (ADU6). As illustrated in the example of FIG. 3B, the XR traffic may include burst transmission which include more data that can be accommodated by a single set of transmissions (e.g., 8 transmissions). The burst transmissions may include multiple ADUs or multiple sets of PDUs that occur over multiple time periods (e.g., windows, cycles, frames, etc.). The example XR traffic pattern illustrated in FIG. 3B cannot be supported efficiently with the current multiple PDSCH/PUSCH transmissions. That is, multiple signaling message are needed to schedule a single burst transmission (group of sets of transmissions) and there is no indication or adjustment of current power save techniques for burst transmissions. Any additional power save operations would require additional signaling and overhead. Accordingly, current multiple PDSCH and PUSCH transmissions cannot handle traffic with large bursts of information, such as XR traffic, efficiently in terms of signaling overhead and power consumption.

In the aspects described herein, a scheduling or network device (e.g., a base station or component thereof) may become aware of or otherwise determine a burst transmission, and then may schedule the burst transmission. In some implementations, the scheduling or network device is an edge network device or base station and receives a burst transmission indication or indications from a core of the network. In other implementations, the scheduling or network device may utilize a processor (e.g., artificial intelligence (AI)/machine learning (ML) algorithms executed thereby) to determine a burst transmission. To illustrate, the scheduling or network device may receive multiple repetitive or similar uplink scheduling requests from a UE and may determine a burst transmission would be more efficient, such as based on thresholds set and adjusted by an AI/ML algorithm.

As another illustration, the scheduling or network device may determine or receive an indication of XR traffic and determine a burst transmission based on the XR traffic. As yet another illustration, based on multiple repetitive or similar downlink scheduling indications sent by the scheduling or network device, the scheduling or network device may determine to schedule a downlink burst transmission. As yet another illustration, the scheduling or network device may receive lots of information to be sent to multiple different UEs and may group together information (e.g., transmissions) for particular UEs to be sent together in a burst transmission to improve power savings. Burst awareness at the scheduling device may help the network improve resource utilization (e.g., optimize scheduling and usage) and improve power saving at UE devices.

Regarding power savings, by scheduling and transmitting more data in a single burst, UE devices can take advantage of power savings modes (e.g., sleep modes) between the bursts, and optionally between sets of a particular burst, to save power. However, there is currently no power saving techniques for multiple transmissions.

Current Connected Mode DRX (CDRX) works based on an inactivity timer to control sleep modes at a UE. This inactivity timer may be inefficient for the proposed burst transmission because the UE needs to have the inactivity timer be long enough to stay awake for multiple packets of burst to be received. However, the inactivity timer also must be kept short enough for meaningful sleep and power savings. Accordingly, current CDRX operations are not suitable for the proposed burst transmissions.

The previous multi-PDSCH/PUSCH indications lack a mechanism to signal additional sets of multi-PDSCH/PUSCH that may be needed to complete a burst transmission, such as an XR burst transmission with one or more ADUs. Additionally, the previous multi-PDSCH/PUSCH indications lack information for or an indication of power savings after transmission and reception of a burst transmission.

In the aspects described herein, indications and signaling mechanisms for indicating and enabling additional sets of multi-PDSCH/PUSCH that may be needed to complete a burst transmission are provided. Additionally, indications and signaling mechanisms for providing power saving mode indication after transmission and reception of a burst transmission are described.

In some implementations, the indication may be an offset to indicate how many additional sets of multi-PDSCH/multi-PUSCH are in the burst. In some other implementations, the indication may be binary and indicate one or more additional sets are present. As exemplary IEs or configurations, these indications or configurations may be referred to as multiset or additionalset.

In a particular implementation, the indication to signal additional sets can be used to also indicate a power save mode or power save operations (e.g., when to sleep/wake). This may be referred to as an implicit indication to enter a sleep mode by using the additional set indication to also indicate when to sleep, wake, or both. For example, an offset indication for multiple set of multi-PDSCH/multi-PUSCH (that is the burst transmission) may provide an implicit indication to transfer to a sleep mode between sets and/or after a last set of the burst transmission.

In an example, operation when a maximum number of PDSCHs allowed (e.g., 8 PDSCHs) or capable to be scheduled by a signaling transmission is not sufficient to transmit a burst transmission, the base station (e.g., gNB) may dynamically or semi-statically indicate to the UE through a new proposed configuration (e.g., multiset or additionalset) the number of sets of multiple PDSCHs needed to complete the transmission of the burst transmission. This indication further affects the UE power savings mode behavior (light sleep, deep sleep, no sleep, etc.). In single indication by the base station, the UE would 1) interpret the number of sets of PDSCHs needed to complete a burst transmission (ADU) and 2) decide to go to deep sleep, light sleep, or stay awake.

In an illustrative example, two sets of multi-PDSCHs are required to complete the burst transmission. When a UE receives an indication (e.g., multiset=1) for a burst transmission, the UE interprets the following, that there are two sets of multiple PDSCH transmissions and the first set will use the maximum number of PDSCHs (e.g., eight PDSCHs) and that the second set will have a number of PDSCHs as indicated by the DCI (e.g., six PDSCHs). The UE may also interpret the indication (e.g., multiset=1) to direct the UE to stay awake after reception of the first set of multiple PDSCHs expecting a second set with the indication of multiset=1. The UE may further interpret the indication (e.g., multiset=1) to direct the UE to go to sleep after reception of the second set of multiple PDSCHs and to not expect a third set for this burst transmission.

The indication may be provided in one signaling message or in multiple signaling messages. To illustrate, for the above example with two sets of transmissions of the burst transmissions, one DCI or two DCIs may be used to provide the signaling. When one DCI is used, one DCI (e.g., a legacy DCI with an indication of multi-set=1) schedules both sets where some fields in the DCI are common between the two sets. When two DCIs are used, a second DCI (e.g., with an indication with multi-set=1) will schedule the second set for flexibility of scheduling for the burst transmission. In such multiple signaling modes, transmission parameters of the sets of the burst transmission may be changed between sets, such as possibly to improve channel/transmission quality.

In some implementations, the UE will go to sleep after reception of the multiple PDSCHs as the burst transmission has been accomplished. In some such implementations, the UE may wake up to send ACKs or retransmissions per legacy behavior for example based on K1 offset, drx-HARQ-RTT-TimerUL, drx-RetransmissionTimerUL, etc. Additionally, or alternatively, the UE may transmit a sleep indication prior to going to sleep. The indication may be sent after completion of the burst transmission. In some other implementations, the UE may transition to a lower power mode before performing such feedback and/or legacy functions before transitioning to a sleep mode.

As another illustrative example, the UE receives an indication of multi-set=0, which indicates to the UE that only one set of multi-PDSCH is required and is sufficient for the base station to clear its buffer of data for the UE. The UE would go to sleep after reception of the first (and final) set of PDSCHs of the burst transmission.

With some indications (e.g., multi-set=1 or greater than 1 or a second indicator bit or flag) indicating that the burst transmission has multiple sets, the UE may be aware that another DCI is scheduling the second set for the same burst (e.g., when a common DCI is not used for each set of the burst transmission). Additionally, with such an indication the UE knows after reception of the final set of PDSCHs that it may go to sleep as the burst transmission has been completed.

With traffic showing up in between sets, the base station can indicate to the UE to wake up either dynamically, through separate messaging (e.g., a wake-up signal (WUS)), or semi-statically, such as through a medium access control (MAC) control element (MAC-CE) command, DCI based wake up signaling 2_6, etc.

The burst transmission indication (e.g., multi-set indication) may be semi-statically or dynamically configured. As an example, the burst transmission indication may be signaled by radio resource control (RRC) message, MAC-CE, or DCI. Accordingly, the burst transmissions may be triggered (aperiodic/dynamic) or periodic.

In one implementation, the burst transmission indication may be signaled or configured by RRC configuration. To illustrate, an RRC message or messages may indicate or schedule multiple burst transmissions or larger burst transmission. RRC configuration may be more suitable for larger burst transmissions and/or more regular or repetitive burst transmissions. Smaller bursts may use only set of multiple transmission. In such one set operation, the indication may indicate a single set of PDSCH or PUSCH transmissions, such as multi-set being set to 0.

In another implementation, the burst transmission indication may be signaled by MAC-CE indication. In some operating scenarios or modes, a UE may need to decode quickly for the UE to find out if it should sleep or not after the first set of PDSCH or PUSCH transmissions of a burst transmission. In such implementations, using MAC-CE based indications for scheduling burst transmissions may offer faster decoding and shorter scheduling delays and/or higher throughput (e.g., less downtime more available bandwidth for the burst transmission) as compared to some other implementations, such as RRC or DCI.

In yet another implementation, the burst transmission indication may be signaled DCI indication. For example, a scheduling device may instruct the UE to postpone the power saving mode (e.g., sleep mode) after the reception of the first set by a single bit in a DCI. In some such implementations, the same bit may be used to indicate that the UE can go to sleep, and that an additional set is expected for this burst transmission.

In some implementations, additional signaling may be used to support the burst transmission after an initial transmission used to indicate the burst transmission. In some such implementations, a first or initial signaling transmission may be used to indicate the burst transmission and to schedule a first set of the burst transmission. A second signaling transmission may be used to indicate (e.g., confirm) and/or schedule a second set of the burst transmission. In a particular implementation, an additional signaling transmission may be used for each set of the burst transmission. In another particular implementation, a second signaling transmission may be used for a last set of the burst transmission or when parameters of the set of the burst transmission are different from a previous set.

In a particular example, a single DCI scheduling two sets of a burst transmission with an indication of multi-set=1 may use an additional field or fields to existing legacy DCI formats so that the DCI can signal the number of transmissions in the second set, and optionally other subsequent sets.

In another particular example, multiple (e.g., two) DCIs may schedule burst transmissions with different fields, such as different time domain resource assignment (TDRA) fields. As compared to using multiple signaling messages, single scheduling provides less overhead and less monitoring. However, having additional signaling provides increased flexibility in scheduling subsequent sets as compared to using a single signaling message.

In some implementations, the multi-set=1 indication may implicitly inform the device to stay awake in between the two sets of the burst transmission and to expect a second DCI between the sets. The multi-set=1 indication may also indicate to go-to-sleep after the burst transmission ends as the UE should not be expecting additional sets for that particular burst transmission.

A UE receiving a multi-set indication may either go into light sleep after the reception of the first set of multi-PDSCH and in between reception of multi-PDSCH sets. The UE may then go into deep sleep after reception of the final set of multi-PDSCH. For such operations, the UE may not receive other sleep signaling from the network and/or may not utilize existing sleep mode control operations (e.g., inactivity timers).

In some implementations, signaling may be used to cancel a portion of the burst transmissions. For example, a burst transmission may include one or more sets of multiple PUSCHs or multiple PDSCHs. When canceling a portion of the burst transmission, a device may cancel one or more sets of the burst. In some implementations, the transmitting device may cancel later sets of the burst transmission after a receiving an acknowledgment from the receiving device. To illustrate, the later sets of the burst transmission may correspond to retransmissions of transmission which were received, and thus these retransmissions may be redundant and not needed.

As an illustrative example, if a scheduling device (e.g., gNB) provided an indication of a burst transmission (e.g., configured a multi-set parameter to equal 1), the scheduling device may later decide the second set may not be needed and send a second DCI after transmission of the first set to cancel the second set. This may happen when enough packets has been received correctly, as only a fraction of PDUs that belong to an ADU may be needed to be successfully delivered for successful transmission of a burst for some operating modes. The receiving device may go into sleep mode after receiving the second DCI and before an originally scheduled sleep time by the initial DCI, which results in increased power savings.

In some implementations, a receiving device provide feedback information for the burst set. For example, the receiving device may transmit acknowledgment information or message, such as ACK and/or NACKs. In some implementations, the receiving device may provide hybrid automatic repeat request (HARQ) feedback. The device may provide the HARQ feedback separately for each set of the burst transmission or jointly for the entire burst transmission. Alternatively, the device may provide feedback for multiple sets of the burst transmission, but less than all sets of the burst transmission. For example, for HARQ retransmissions with multi-set configuration, the HARQ feedback for a first set of the burst transmission and the HARQ feedback for a second set of the burst transmission could be transmitted on two different PUCCH resources or on the same PUCCH resource.

A base station with burst awareness may postpone sending packets of a new burst until a next wakeup cycle or until enough packets are set for the new burst. Such operations may impart some latency. However, the base station can also add additional sets of PDSCHs to a current burst transmission to reduce some such latency, and then send the UE to sleep after the burst.

Burst transmission operations may extend an on-duration time of a UE until all packets of current burst are transmitted or received. Configuring (reconfiguring) CDRX to depend on a burst length or dynamically changing CDRX parameters to match the burst transmission time may require additional signaling and overhead. Such overhead can be reduced by implicitly or explicitly configuring the UE to override the CDRX expected behavior and to perform sleep operations based on the burst transmissions. Such may provide enhanced interoperation with CDRX with reduced signaling.

In some implementations, the wireless communication devices may include using RRC configuration to indicate sleep mode after multi-PDSCH reception or multi-PUSCH transmission. For example, when a maximum number of PDSCHs allowed in multi-PDSCH setting (currently DCI 0_1 scheduling up to 8 PUSCH, similarly Rel-17 heading toward scheduling up to 8 PDSCH) is not sufficient to transmit a burst, RRC configurations can be used to control power savings modes or timings.

As one example, an RRC configuration of a particular IE (e.g., offafterMultiPUSCH) may be used and may be tied to the mechanism of burst transmissions (e.g., multi-PDSCH/PUSCH reception/transmission) through the downlink control (e.g., PUCCH or DCI) bits that enable the burst reception/transmission.

To illustrate, if a downlink transmission already has bits signaling a burst transmission (e.g., DCI 0_1 with bits already signaling multi-PUSCH transmission supporting uplink burst transmissions), when a device receives an indication of a burst transmission the device may use (e.g., directly interpret) the related burst transmission RRC configuration and transition to a power savings mode after the burst transmission. In one implementation, the device may transmission into a sleep mode after transmission of the burst (such as light sleep) or after transmission of an indication of the burst.

As another illustration, if a downlink transmission does not already include bits signaling a burst transmission (e.g., a DCI with a format of DCI 1_0 or DCI 1_1), the downlink transmission may be able to be configured to indicate burst transmission with enhancements (e.g., additional configurations to reuse or interpret different fields as indicating a burst transmission). When a device determines that a burst transmission is indicated by the downlink, either implicitly or explicitly, the device may use the RRC configuration (e.g., offafterMultiPDSCH) as an indication that transmitting device (e.g., gNB) has cleared its buffer. They device (e.g., UE) may then be able to go to sleep after the burst reception.

When the RRC configuration for burst transmission is enabled or configured, the devices may use no additional signaling and/or no additional downlink bits (e.g., DCI bits) to indicate sleep mode after burst reception.

Figure 4:
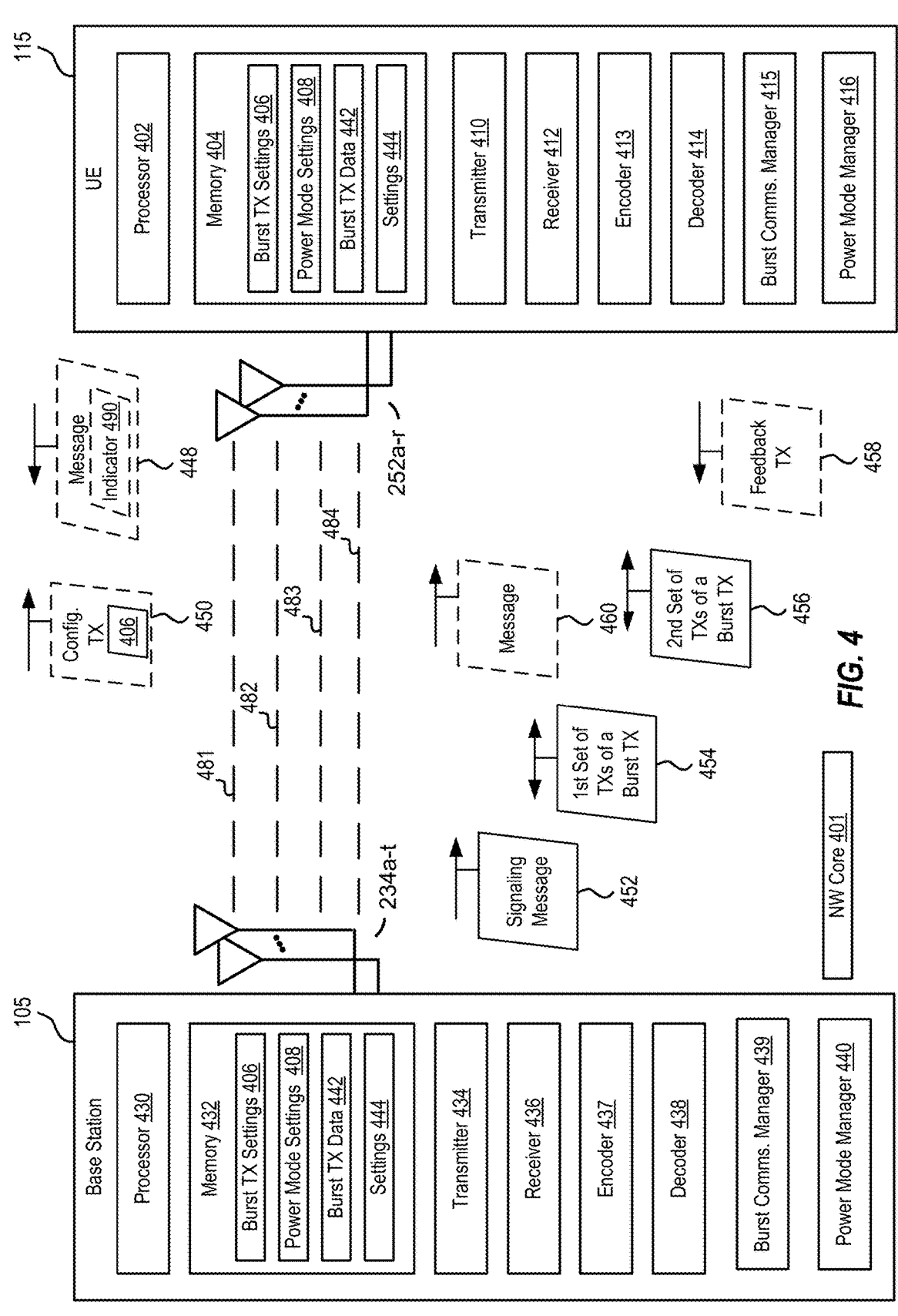
FIG. 4 is a block diagram illustrating an example wireless communication system that supports enhanced burst transmission operations according to one or more aspects.

FIG. 4 illustrates an example of a wireless communications system 400 that supports enhanced burst transmission operations in accordance with aspects of the present disclosure. In some examples, wireless communications system 400 may implement aspects of wireless communication system 100. For example, wireless communications system 400 may include a network entity, such as a network device or base station 105, one or more UEs, such as UE 115, and a network core 401. A network entity may include or correspond to a base station (e.g., base station 105) or a portion of a base station in such implementation where aspects of a traditional base station are distributed amongst multiple devices which may be non-co-located (e.g., in different locations). Alternatively, the network entity may include or correspond to a different network device (e.g., not a base station). Enhanced burst transmission operations may reduce signaling overhead, power consumption, and latency and increase throughput. Thus, network and device performance can be increased.

Network core 401, base station 105 and UE 115 may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

It is noted that SCS may be equal to 15, 30, 60, or 120 kHz for some data channels. Network core 401, base station 105 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network core 401, base station 105 and UE 115. For example, the control information may be communicated suing MAC-CE transmissions, RRC transmissions, DCI (downlink control information) transmissions, UCI (uplink control information) transmissions, SCI (sidelink control information) transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, burst communications manager 415, power mode manager 416, and antennas 252*a-r*. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store burst transmission settings data 406, power mode settings data 408, burst transmission data 442, settings data 444, or a combination thereof, as further described herein.

The burst transmission settings data 406 includes or corresponds to data associated with or corresponding to settings information for burst transmissions. For example, the burst transmission settings data 406 may include configuration settings, transmission settings, etc., of one or more burst transmission modes. The burst transmission settings data 406 may further include burst configurations, such as pre-set configurations or static configurations, in addition to semi-static and dynamic configurations (e.g., RRC configured). For example, the burst transmission settings data 406 includes data for performing operations for transmitting and receiving burst transmission. To illustrate, the UE 115 may utilize the burst transmission settings data 406 to interpret signaling messages and configuration settings (e.g., multiset or additionalset configurations).

The power mode settings data 408 includes or corresponds to data associated with or corresponding to information for power mode settings and for transitioning to and/or between power mode settings. For example, the power mode settings data 408 may include settings for any reduced power mode or low power mode as described herein. To illustrate, the power mode settings data 408 include data for operating in any reduced power mode or low power mode as described herein. Additionally, the power mode settings data 408 include data for transitioning between power modes. For example, the power mode settings data 408 may include or correspond to triggers and/or timers for switching between particular modes and/or transitioning to a particular mode. The power mode settings data 408 may further include operations for determining or adjusting the settings or conditions for transitioning between power modes (e.g., such as legacy settings or timers for controller power save modes, such as CDRX). For example, the power mode settings data 408 includes data for performing operations for pausing or suspending current power save mode (also referred to as power savings mode) operations or overriding certain power save mode operations.

The burst transmission data 442 includes or corresponds to data indicating or corresponding to the burst transmissions. For example, the burst transmission data 442 may include data indicating information of the burst transmission or transmissions, e.g., the payload or traffic. Additionally, or alternatively, the burst transmission data 442 may include data indicating transmission settings of the burst transmission or transmissions, scheduling information of the burst transmission or transmissions, or both. In some implementations, the burst transmission data 442 includes or corresponds to data for burst transmission scheduling requests or availability for burst transmissions.

The settings data 444 includes or corresponds to data associated with enhanced burst transmission operations. The settings data 444 may include one or more types of burst transmission operation modes and/or thresholds or conditions for switching between burst transmission modes and/or configurations. For example, the settings data 444 may have data indicating different thresholds and/or conditions for different burst transmission modes, such as a single signaling mode, a multiple signaling mode, an implicit operation mode, an explicit configuration mode (e.g., configuration setup by RRC), etc.

The settings data 444 may optionally include or corresponds to data associated with standards and/or legacy operations. Such operations include legacy power saving operations (e.g., CDRX) and standards related feedback operations (HARQ). For example, the settings data 444 may include settings for controlling wake up for sending ACKs or retransmissions per legacy behavior, such as based on a K1 offset, drx-HARQ-RTT-TimerUL, drx-Retransmission-TimerUL, or a combination thereof.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Burst communications manager 415 may be configured to determine and perform burst transmission transmit and receive operations. For example, burst communications manager 415 is configured to determine burst communication timing, burst transmission generation, burst transmission reception, etc. As another example, burst communications manager 415 is configured to determine whether to perform enhanced burst transmission operations. In some implementations, the burst communications manager 415 is configured to determine what particular burst transmission mode to operate in, such as single or multiple signaling.

Power mode manager 416 may be configured to determine and perform power mode operations. For example, power mode manager 416 is configured to determine when to switch to or between power modes, including low power mode or power save modes, and how to operate in such modes (e.g., wake up, sleep, etc.). As another example, power mode manager 416 is configured to determine whether to adjust settings of one or more power modes or triggers/conditions for switching between power modes. In implementations in which it is determined to perform a burst transmission, the power mode manager 416 may be configured to adjust the current power save operation settings or conditions for transition between certain power mode operations.

Base station 105 includes processor 430, memory 432, transmitter 434, receiver 436, encoder 437, decoder 438, burst communications manager 439, power mode manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store burst transmission settings data 406, power mode settings data 408, burst transmission data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, UEs and/or base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of UE 115 described with reference to FIG. 2.

Encoder 437, and decoder 438 may include the same functionality as described with reference to encoder 413 and decoder 414, respectively. Burst communications manager 439 may include similar functionality as described with reference to burst communications manager 415. Power mode manager 440 may include similar functionality as described with reference to power mode manager 416.

Network Core 401 may include one or more elements similar to base station 105. Network core 401 and base station 105 may be configured to communicate over a wired communication network (e.g., backhaul network).

During operation of wireless communications system 400, base station 105 may determine that UE 115 has enhanced burst transmission operation capability. For example, UE 115 may transmit a message 448 that includes an enhanced burst transmission indicator 490 (e.g., a burst transmission capability indicator). Indicator 490 may indicate enhanced burst transmission operation capability for one or more communication modes, such as downlink, uplink, etc. In some implementations, a network entity (e.g., a base station 105) sends control information to indicate to UE 115 that enhanced burst transmission operation and/or a particular type of enhanced burst transmission operation is to be used. For example, in some implementations, message 448 (or another message, such as configuration transmission 450) is transmitted by the UE 115. The configuration transmission 450 may include or indicate to use enhanced burst transmission operations or to adjust or implement a setting of a particular type of enhanced burst transmission operation. For example, the configuration transmission 450 may include burst transmission settings data 406, as indicated in the example of FIG. 4, power mode settings data 408, or both.

During operation, devices of wireless communications system 400, perform enhanced burst transmission operations. For example, the base station and UE 115 may exchange burst transmissions via uplink and/or downlink communications, such as via a downlink channel as illustrated in the example of FIG. 4. The burst transmission may include multiple set of PDSCHs transmitted by the UE 115 or multiple sets of PUSCHs transmitted by the base station 105.

In the example of FIG. 4, the base station 105 transmits a signaling message 452. The signaling message 452 may include or correspond to a burst transmission scheduling message. In some implementations, the signaling message 452 comprises a PDCCH transmission, such as a DCI. In some such implementations, the burst transmission indication, the power save indication, or both, may be provided by a TDRA field of the DCI. In other implementations, another legacy field or a new field may be used to indicate the burst transmission, the power save indication, or both. In some other implementations, the signaling message 452 comprises a MAC-CE or RRC message. The signaling information may include a single bit or multiple bits. For example, a single bit (e.g., a value thereof such as 0 or 1) may indicate additional sets of transmissions. As another example, a multiple bit filed may indicate a number of additional sets of transmissions, such as 4 bit field may indicate up to 8 sets of transmissions, or up to 64 transmissions when a current limit of 8 is used.

The UE 115 may receive the signaling message 452 and may perform one or more evaluations or determinations on the signaling message 452 or using the signaling message 452. The UE 115 may determine an indication of a burst transmission and scheduling of at least a first portion of the burst transmission based on the signaling message 452, and may use this information to monitor for resources for the first portion. The UE 115 may determine scheduling information for multiple portions or the entirety of the burst transmission (e.g., an end of the burst transmission) based on the signaling message 452 in some implementations. Additionally, the UE 115 may determine power mode settings based on the signaling message 452. For example, the UE 115 may determine to use a first power mode between portions of the burst and/or may determine to use a second power mode after completion of the burst transmission. In some implementations, the first and second power modes are sleep modes. Additionally, or alternatively, the first and second power modes may be the same or different. Examples of indication and scheduling operation variations for signaling messages are further described with reference to FIGS. 5-8.

The base station 105 transmits a first portion (e.g., first set of transmissions) of the burst transmission indicated by the signaling message 452, a first set of transmissions 454. The first set of transmissions 454 (also referred to herein as a first set of the burst transmission or the first set of transmissions (PDSCH/PUSCH) of the burst transmission) may include or correspond to a first set of multiple PDSCHs or PUSCHs of the burst transmission message indicated by the signaling message 452. In some implementations, the first set of transmissions 454 comprises a maximum number of PDSCHs or PUSCHs, such as 8 PDSCHs in the example of FIG. 4. In some other implementations, the first set of transmissions 454 comprises 8 PUSCHs. The first portion of the burst transmission indicated by the signaling message 452, the first set of transmissions 454, is also scheduled by the signaling message 452.

The UE 115 monitors first transmission resources associated with the first portion of the burst transmission, the first set of transmissions 454, based on the signaling message 452. The UE 115 may optionally receive and successfully decode one or more of the transmissions (PDSCHs) of the first portion of the burst transmission, the first set of transmissions 454, while monitoring the first transmission resources.

The UE 115 may optionally transition to another power mode after reception of the first portion of the burst transmission, the first set of transmissions 454 based on the signaling message 452. For example, the UE 115 may determine to enter a light sleep or a power savings mode in between portions of the burst transmissions, such as for at least a portion of the time in between the first set of transmissions 454 and a second set of transmissions 456. As another example, the UE 115 may determine to not enter a power savings mode in between portions of the burst transmissions, such as stay awake for the time in between the first set of transmissions 454 and the second set of transmissions 456.

The base station 105 transmits a second portion of the burst transmission indicated by the signaling message 452, the second set of transmissions 456. The second set of transmissions 456 (also referred to herein as a second set of the burst transmission or the second set of transmissions (PDSCH/PUSCH) of the burst transmission) may include or correspond to a second set of multiple PDSCHs or PUSCHs of the burst transmission message indicated by the signaling message 452. In some implementations, the second set of transmissions 456 comprises less than a maximum number of PDSCHs or PUSCHs, such as 4 PDSCHs out of an maximum of 8 PDSCHs that can be scheduled by the signaling message 452. In some other implementations, the sets of transmission 454 and 456 comprises PUSCHs. The second portion of the burst transmission indicated by the signaling message 452, the second set of transmissions 456, may be scheduled by the signaling message 452. In some other implementations, a second signaling message is used to schedule or cancel the second portion of the burst transmission, the second set of transmissions 456, as described further with reference to FIGS. 6 and 7.

The UE 115 monitors second transmission resources associated with the second portion of the burst transmission, the second set of transmissions 456, based on the signaling message 452 or the second signaling message. The UE 115 may optionally receive and successfully decode one or more of the transmissions (PDSCHs) of the second portion of the burst transmission, the second set of transmissions 456, while monitoring the second transmission resources.

The UE 115 may transition to another power mode after reception of the second portion of the burst transmission, the second set of transmissions 456 based on the signaling message 452 or the second signaling message.

The UE 115 may optionally transmit a feedback transmission 458. The feedback transmission 458 may include or correspond to an acknowledgment message (e.g., ACK or NACK) or a power mode signaling message (e.g., sleep or wake indication). In some implementations, the feedback transmission 458 comprises a PUCCH transmission, such as a UCI. In some other implementations, the feedback transmission 458 comprises a MAC-CE.

Although the feedback transmission 458 is illustrated as a single transmission and occurring after the second set of transmissions 456, in other implementations, multiple feedback transmissions (e.g., first and second feedback transmissions similar to the feedback transmission 458) may be used. For example, a feedback transmission (e.g., acknowledgment message (e.g., ACK or NACK) may be sent after each set of the burst transmission. As another example, the UE 115 may send two types of feedback transmissions after the second set of the burst transmission. To illustrate, the UE

115 may send a joint feedback transmission for multiple sets of the burst transmission (e.g., acknowledgement message for the sets of transmissions 454 and 456) and also send a power signaling message type feedback after the second set of transmissions 456.

Optionally, in some implementations, the base station 105 transmits a configuration message 460 prior to sending the signaling message 452. For example, the base station 105 transmits a higher layer configuration message, such as a RRC message, to configure one or more burst transmission parameters at the UE 115, such as offafterMultiPUSCH. To illustrate, the RRC message may include or indicate a parameter or IE of multiset or additionalset or how to interpret a parameter or IE of multiset or additionalset in a signaling message (e.g., the signaling message 452 for burst transmissions). This configured parameter can be used by the UE 115 to interpret multiple PUSCH/PDSCH transmissions in signaling messages and/or used by the UE 115 to interpret power savings mode operations for burst transmissions. As an illustrative, non-limiting examples, the UE 115 may determine to enter a power savings mode after completion of a burst transmission and that multiple transmission indications indicate a particular type of burst transmission (e.g., one additional set, a number of additional sets to be indicated by second signaling, multiple additional sets, etc.). In some implementations, this configuration message 460 may include or correspond to configuration transmission 450. In other implementations, the configuration message 460 is a separate message.

Optionally, in some implementations, the base station 105 receives a burst indication from the network core 401 prior to configuring or scheduling the burst transmission (e.g., the first and second sets of transmissions 454, 456). The base station 105, such as the burst communication manager 439, may determine to perform burst transmissions, configure UEs for burst transmissions, and/or schedule burst transmissions based on the burst indication (e.g., a burst indication transmission or a burst indication in a message).

Optionally, in some implementations, the UE 115 transmits one or more scheduling requests to the base station 105 requesting uplink resources prior to the base station 105 configuring or scheduling the burst transmission (e.g., the first and second sets of transmissions 454, 456). The base station 105, such as the burst communication manager 439, may determine to perform burst transmissions, configure UEs for burst transmissions, and/or schedule burst transmissions based on the scheduling requests.

Accordingly, the network (e.g., the base station 105 and the UE 115) may be able to more efficiently perform burst transmission operations (e.g., multiple PDSCH/PUSCH operations) including longer bursts and signal power saving modes. Thus, FIG. 4 describes enhanced burst transmission operations. Using enhanced burst transmission operations may enable improvements when operating in a XR operations mode of for XR traffic/applications. Performing enhanced burst transmission operations enables reduced bandwidth/spectrum waste when sending and receiving burst transmissions and thus, enhanced UE and network performance by increasing throughput and reducing latency. The efficiencies are achieved with the additional benefit of reduced power consumption at the UE.

FIGS. 5-8 illustrate examples of diagrams of a wireless communication system that supports enhanced safety message reporting operations according to one or more aspects. The examples of FIGS. 5-8 includes similar devices to the devices described in FIGS. 1, 2, and 4, such as UE 115 and base station 105. The devices, such as UE 115 and base station 105, of FIGS. 5-8 may include one or more of the components as described in FIGS. 2 and 4. In FIGS. 5-8, these devices may utilize antennas 252*a-r*, transmitter 410, receiver 412, encoder 413 and/or decoder 414, or may utilize antennas 234*a-t*, transmitter 434, receiver 436, encoder 437 and/or decoder 438 to communicate transmissions and receptions.

Figure 5:
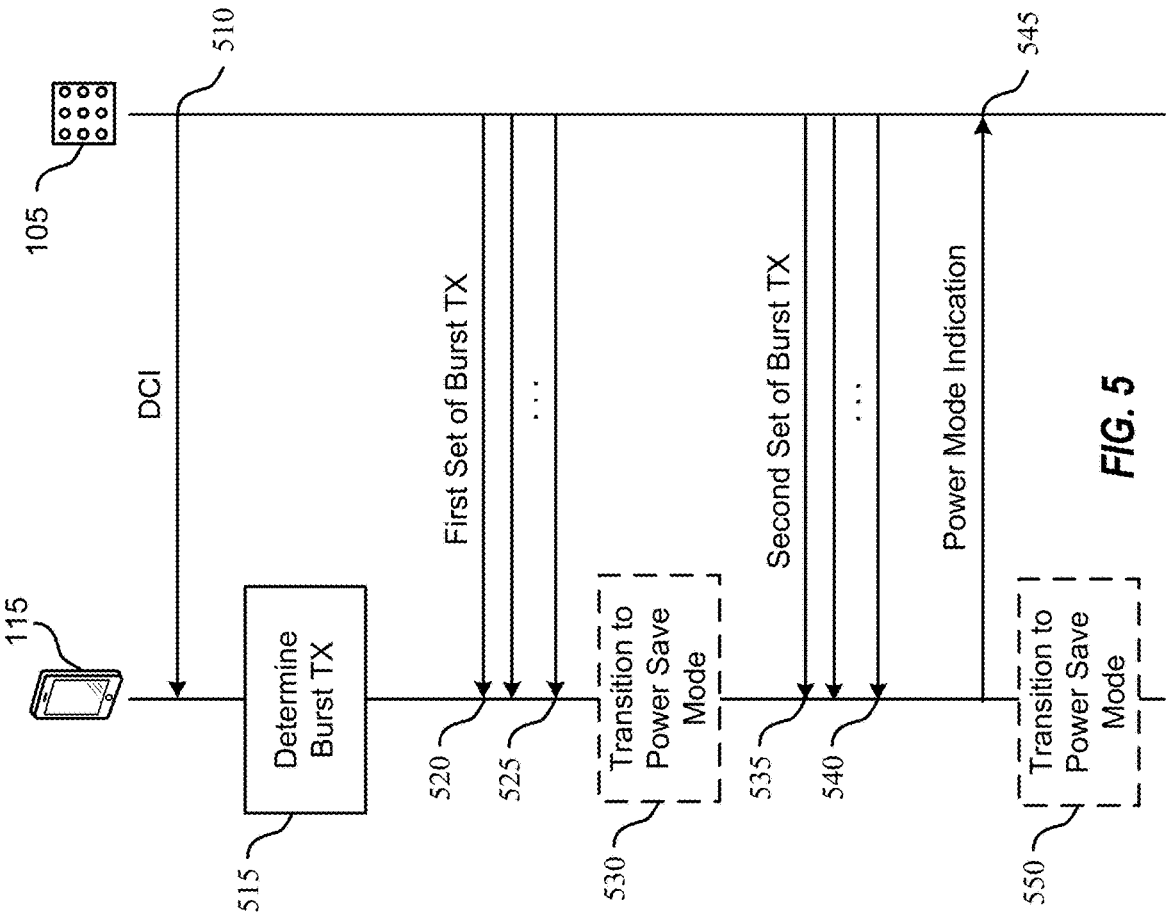
FIG. 5 is a timing diagram illustrating an example wireless communication system that supports enhanced burst transmission operations according to one or more aspects.

Referring to FIG. 5, FIG. 5 is a diagram 500 of enhanced burst transmission operations. Although the example illustrated in FIG. 5 depicts a single network device and a single UE, in other implementations, the operations may occur between other wireless communication devices, such as vehicle UEs, base stations, IoT devices, etc., and the network may include multiples of such devices.

At 510, the base station 105 transmits a signaling message, such as a burst transmission signaling message. For example, the base station 105 (e.g., base station) transmits a DCI to the UE 115 which indicates a burst transmission. As other examples, the network device (e.g., base station 105) transmits a MAC-CE or RRC message to the UE 115 which indicates a burst transmission. The signaling message may include or provide a burst transmission indication. In some implementations, the message includes a burst transmission indication, such as an explicit indication in dedicated field. In other implementations, the signaling message implicitly indicates the burst transmission indication by reusing an existing or legacy field.

Additionally, the signaling message may include or indicate a power savings indication. For example, the signaling message may indicate to transition to a sleep mode as described herein.

In a particular implementation, the base station 105 transmits a burst transmission configuration message prior to the signaling message. In some such implementations, the configuration for the UE is explicitly provided. This configuration may be explicitly indicate to go to sleep mode after multi-PDSCH reception or multi-PUSCH transmission. When no burst transmission configuration message is used, the burst transmission operations may be referred to as implicit, such as implicit indication to sleep mode using an offset to indicate multiple sets of multi-PDSCH/multi-PUSCH.

At 515, the UE 115 receives and decodes the signaling message. The UE 115 may decode the signaling message to determine the burst transmission indication, and may determine the burst transmission based on the burst transmission indication. For example, the UE 115 may determine that a first set of the burst transmission is scheduled by the signaling message. As another example, the UE 115 may determine that multiple sets (e.g., a first set and a second set) of the burst transmission are scheduled by the signaling message.

Additionally, the UE 115 may determine a power savings indication based on the signaling message. For example, the UE 115 may determine a sleep mode indication based on the signaling message, such as based on the indicator for multiple sets of transmissions or based on another (e.g., dedicated) indicator. The power savings indication and modes or settings there may include an indication for power modes between sets of the burst transmission, for power modes after an end of the burst transmission (e.g., last set thereof), or both.

From 520 to 525, the base station e 105 transmits the first set of the burst transmission. For example, the base station 105 transmits a first set of PDSCH transmissions (e.g., 8 PDSCHs in the example of FIG. 5) to the UE 115 based on the indication of the signaling message. The signaling message schedules the first set of PDSCH transmissions.

The UE 115 may receive and decode the first set of transmissions of the burst transmission. For example, the UE 115 may monitor resources associated with the first set of the burst transmission based on the signaling message which scheduled the first set of PDSCH transmissions. The UE 115 may successful receive and decode each PDSCH transmission of the first set. As another example, the UE 115 may determine that multiple sets (e.g., a first set and a second set) of the burst transmission are scheduled by the signaling message.

At 525, the UE 115 optionally determines to transition to a power savings mode. For example, the UE 115 determines that the first set of transmissions of the burst transmission is not a last set of transmissions of the burst transmission based on the signaling message. Although this determination is illustrated at 525 in FIG. 5 this is for illustrative purposes, the determination may be made prior to 525 and the end of the first set in other implementations.

At 530, the UE 115 optionally transitions to a power savings mode based on the determination. For example, the UE 115 transitions to a power savings mode (e.g., low power or sleep mode) based on the determination, which was made based on the signaling message. Although this transition is illustrated at 545 in FIG. 5, the transition may be made at or after 525 and the end of the first set of transmissions in other implementations. To illustrate, the UE 115 may send a power savings signaling message prior to transitioning to the power saving mode in some such implementations. For example, the UE 115 sends a sleep mode indication message to the base station 105.

At or before 535, the UE 115 optionally transitions out of the power savings mode. For example, in such implementations where the UE 115 transitioned to the power savings mode, the determines to transition out of the power savings mode based on the signaling message. To illustrate, the UE 115 may wake from a sleep mode based on a timer or time set based on the signaling message and independent of an inactivity timer (e.g., CDRX inactivity timer).

From 535 to 540, the base station 105 transmits the second set of the burst transmission. For example, the base station 105 transmits a second set of PDSCH transmissions (e.g., 6 PDSCHs in the example of FIG. 5) to the UE 115 based on the indication of the signaling message. The signaling message schedules the second set of PDSCH transmissions in the example of FIG. 5.

The UE 115 may receive and decode the second set of the burst transmission. For example, the UE 115 may monitor resources associated with the second set of the burst transmission based on the signaling message which scheduled the second set of PDSCH transmissions. The UE 115 may successful receive and decode each PDSCH transmission of the second set. As another example, the UE 115 may determine that other additional sets (e.g., a third set) of the burst transmission are scheduled by the signaling message.

At 540, the UE 115 determines the burst transmission has completed. For example, the UE 115 determines that the second set of the burst transmission is a last set of the burst transmission based on the signaling message and that the burst transmission has ended based on the signaling message. Although this determination is illustrated at 540 in FIG. 5 this is for illustrative purposes, the determination may be made prior to 540 and the end of the second set in other implementations.

At 540, the UE 115 determines to transition to a power savings mode. For example, the UE 115 determines that the second set of the burst transmission is a last set of the burst transmission based on the signaling message and that the burst transmission has ended based on the signaling message. The UE 115 may determine to enter the power savings mode based on the signaling message. Although this determination is illustrated at 535 in FIG. 5 this is for illustrative purposes, the determination may be made prior to 535 and the end of the second set in other implementations.

At 550, the UE 115 transitions to the power savings mode. For example, the UE 115 transitions to the power savings mode after (e.g., immediately after) reception of the second set and based on the determination, which was made based on the signaling message. The transition to the power savings mode based on the signaling message (e.g., DCI) may occur before a regularly scheduled transition to a power save mode via another process, such as CDRX. Although this transition is illustrated at 550 in FIG. 5, the transition may be made at or after 540 and the end of the second set in other implementations. To illustrate, the UE 115 may send a power savings signaling message prior to transitioning to the power saving mode in some such implementations, such as at 545. For example, the UE 115 sends a sleep mode indication message to the base station 105.

The power savings mode may include any reduced power mode or low power mode as described herein. In some implementations, the power savings mode is a sleep mode. In a particular implementation, such as where the UE 115 has multiple levels of sleep mode (e.g., light and deep sleep), the UE 115 may enter into one particular sleep mode (e.g., deep sleep) after the end of the burst transmission and may enter into another particular sleep mode (e.g., light sleep mode) between sets of the burst transmission. Alternatively, the UE 115 may transition into other low power modes between sets and after a last set of the burst transmission.

Thus, in the example in FIG. 5, the wireless communication devices perform enhanced burst transmission operations by utilizing a single signaling message. That is, the burst transmission may include more than one set of transmissions (e.g., multiple multi-set PDSCH transmissions) and all such transmission may be scheduled by a single signaling message for lower signaling overhead and increased throughput. Additionally, power savings operations for the burst transmission operations may also be signaled by the single signaling message. Specifically, the power savings operations may be implicitly indicated by the signaling message also or explicitly indicated/configured by a prior RRC message and by the signaling message. As described herein, the power savings operations enable enhancements over prior time based sleep mode operations (e.g., CDRX).

Figure 6:
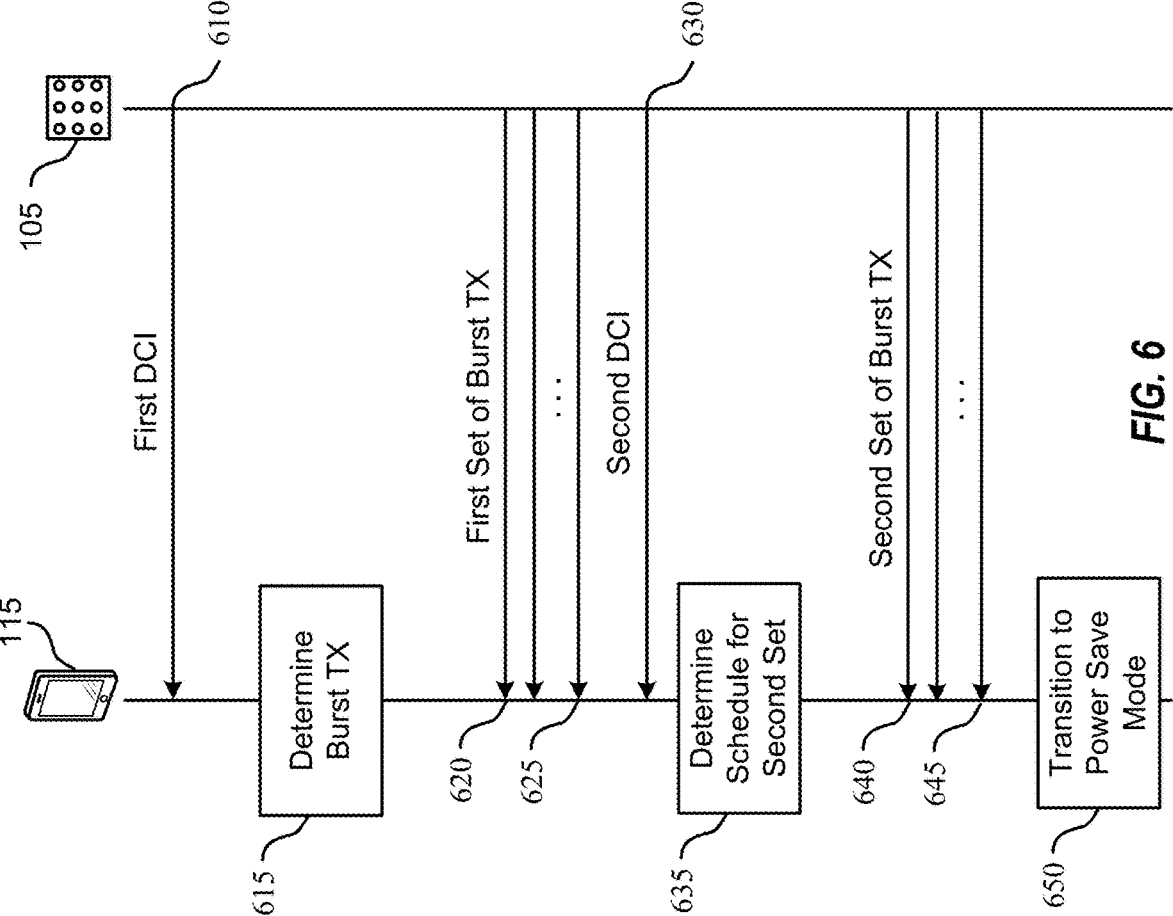
FIG. 6 is a timing diagram illustrating another example wireless communication system that supports enhanced burst transmission operations according to one or more aspects.

Referring to FIG. 6, FIG. 6 is a diagram 600 of enhanced burst transmission operations. Although the example illustrated in FIG. 6 depicts a single network device and a single UE, in other implementations, the operations may occur between other wireless communication devices, such as vehicle UEs, base stations, IoT devices, etc., and the network may include multiples of such devices. As compared to the example of FIG. 5 which illustrates single signaling message operations, the example of FIG. 6 illustrates multiple signaling message operations.

At 610, the base station 105 transmits a first signaling message, such as a burst transmission signaling message. For example, the base station 105 transmits a first DCI to the UE 115 which indicates a burst transmission. As other examples, the base station 105 transmits a MAC-CE or RRC message to the UE 115 which indicates a burst transmission. The first signaling message may include or provide a burst transmission indication. In some implementations, the message includes a burst transmission indication, such as an explicit indication in dedicated field. In other implementations, the first signaling message implicitly indicates the burst transmission indication by reusing an existing or legacy field.

Additionally, the signaling message may include or indicate a power savings indication. For example, the signaling message may indicate to transition to a sleep mode as described herein.

In a particular implementation, the base station 105 transmits a burst transmission configuration message prior to the first signaling message. In some such implementations, the configuration for the UE is explicitly provided. This configuration may be explicitly indicate to go to sleep mode after multi-PDSCH reception or multi-PUSCH transmission. When no burst transmission configuration message is used, the burst transmission operations may be referred to as implicit, such as implicit indication to sleep mode using an offset to indicate multiple sets of multi-PDSCH/multi-PUSCH.

At 615, the UE 115 receives and decodes the first signaling message. The UE 115 may decode the first signaling message to determine the burst transmission indication, and may determine the burst transmission based on the burst transmission indication. For example, the UE 115 may determine that a first set of transmissions of the burst transmission is scheduled by the first signaling message. As another example, the UE 115 may determine that multiple sets (e.g., a first set and a second set) of the burst transmission are scheduled by the first signaling message.

From 620 to 625, the base station 105 transmits the first set of transmissions of the burst transmission. For example, the base station 105 transmits a first set of PDSCH transmissions (e.g., 8 PDSCHs in the example of FIG. 6) to the UE 115 based on the indication of the first signaling message. The first signaling message schedules the first set of PDSCH transmissions.

The UE 115 may receive and decode the first set of transmissions of the burst transmission. For example, the UE 115 may monitor resources associated with the first set of the burst transmission based on the first signaling message which scheduled the first set of PDSCH transmissions. The UE 115 may successful receive and decode each PDSCH transmission of the first set. As another example, the UE 115 may determine that multiple sets (e.g., a first set and a second set) of the burst transmission are scheduled by the first signaling message.

Additionally, the UE 115 may determine a power savings indication based on the signaling message. For example, the UE 115 may determine a sleep mode indication based on the signaling message, such as based on the indicator for multiple sets of transmissions or based on another (e.g., dedicated) indicator. The power savings indication and modes or settings there may include an indication for power modes between sets of the burst transmission, for power modes after an end of the burst transmission (e.g., last set thereof), or both.

At 625, the UE 115 optionally determines to transition to a power savings mode. For example, the UE 115 determines that the first set of the burst transmission is not a last set of the burst transmission based on the first signaling message. Although this determination is illustrated at 625 in FIG. 6 this is for illustrative purposes, the determination may be made prior to 625 and the end of the first set in other implementations.

At 625, the UE 115 optionally transitions to a power savings mode based on the determination. For example, the UE 115 transitions to a power savings mode (e.g., low power or sleep mode) based on the determination, which was made based on the first signaling message. Although this transition is illustrated at 625 in FIG. 6, the transition may be made after 625 and the end of the first set in other implementations. To illustrate, the UE 115 may send a power savings signaling message prior to transitioning to the power saving mode in some such implementations. For example, the UE 115 sends a sleep mode indication message to the base station 105.

At or before 630, the UE 115 optionally transition outs of the power savings mode. For example, in such implementations where the UE 115 transitioned to the power savings mode, the determines to transition out of the power savings mode based on the first signaling message. To illustrate, the UE 115 may wake from a sleep mode based on a timer or time set based on the first signaling message and independent of an inactivity timer (e.g., CDRX inactivity timer).

At 630, the base station 105 transmits a second signaling message, such as a second burst transmission signaling message. For example, the base station 105 transmits a second DCI to the UE 115 which schedules the second set of transmissions of the burst transmission indicated by the first DCI. As other examples, the base station 105 transmits a MAC-CE or RRC message to the UE 115 which schedules the second set of the burst transmission indicated by the first signaling message, which may be the same type (e.g., RRC or MAC-CE) or a different type (e.g., DCI). The second signaling message may include similar or different transmission parameters from the first signaling message. The second signaling message may provide additional flexibility the cost of some additional minor overhead and power consumption as compared to the single signaling message operations of FIG. 5.

The UE 115 receives and decodes the second signaling message. At 635, the UE 115 determines a schedule for a second set of transmissions of the burst transmission. The UE 115 may decode the second signaling message to determine the amount of PDSCHs in the second set and a timing thereof, and optionally determines whether the second set of the burst transmission is a last set of the burst transmission.

From 640 to 645, the base station 105 transmits the second set of transmissions of the burst transmission. For example, the base station 105 transmits a second set of PDSCH transmissions (e.g., 6 PDSCHs in the example of FIG. 6) to the UE 115 based on the indication of the second signaling message. The second signaling message schedules the second set of PDSCH transmissions in the example of FIG. 6.

The UE 115 may receive and decode the second set of the burst transmission. For example, the UE 115 may monitor resources associated with the second set of the burst transmission based on the second signaling message which scheduled the second set of PDSCH transmissions. The UE 115 may successful receive and decode each PDSCH transmission of the second set. As another example, the UE 115 may determine that other additional sets (e.g., a third set) of the burst transmission are scheduled by the second signaling message.

At 645, the UE 115 determines the burst transmission has completed. For example, the UE 115 determines that the second set of the burst transmission is a last set of the burst transmission based on the second signaling message and that the burst transmission has ended based on the second signaling message. Although this determination is illustrated at 640 in FIG. 6 this is for illustrative purposes, the determination may be made prior to 640 and the end of the second set in other implementations.

At 645, the UE 115 determines to transition to a power savings mode. For example, the UE 115 determines that the second set of the burst transmission is a last set of the burst transmission based on the second signaling message and that the burst transmission has ended based on the second signaling message. The UE 115 may determine to enter the power savings mode based on the second signaling message. Although this determination is illustrated at 640 in FIG. 6 this is for illustrative purposes, the determination may be made prior to 640 and the end of the second set in other implementations.

At 650, the UE 115 transitions to the power savings mode. For example, the UE 115 transitions to the power savings mode after reception of the second set and based on the determination, which was made based on the second signaling message. Although this transition is illustrated at 640 in FIG. 6, the transition may be made after 640 and the end of the second set in other implementations. To illustrate, the UE 115 may send a power savings signaling message prior to transitioning to the power saving mode in some such implementations. For example, the UE 115 sends a sleep mode indication message to the base station 105.

The power savings mode may include any reduced power mode or low power mode as described herein. In some implementations, the power savings mode is a sleep mode. In a particular implementation, such as where the UE 115 has multiple levels of sleep mode (e.g., light and deep sleep), the UE 115 may enter into one particular sleep mode (e.g., deep sleep) after the end of the burst transmission and may enter into another particular sleep mode (e.g., light sleep mode) between sets of the burst transmission. Alternatively, the UE 115 may transition into other low power modes between sets and after a last set of the burst transmission.

Thus, in the example in FIG. 6, the wireless communication devices perform enhanced burst transmission operations by utilizing multiple signaling message. That is, the burst transmission may include more than one set of transmissions (e.g., multiple multi-set PDSCH transmissions) and such additional sets of the burst transmission may be scheduled by additional signaling messages for additional flexibility. Additionally, power savings operations for the burst transmission operations may also be signaled by the signaling messages. Specifically, the power savings operations may be implicitly indicated by the signaling messages also or explicitly indicated/configured by a prior RRC message and by the signaling messages. As described herein, the power savings operations enable enhancements over prior time based sleep mode operations (e.g., CDRX).

Figure 7:
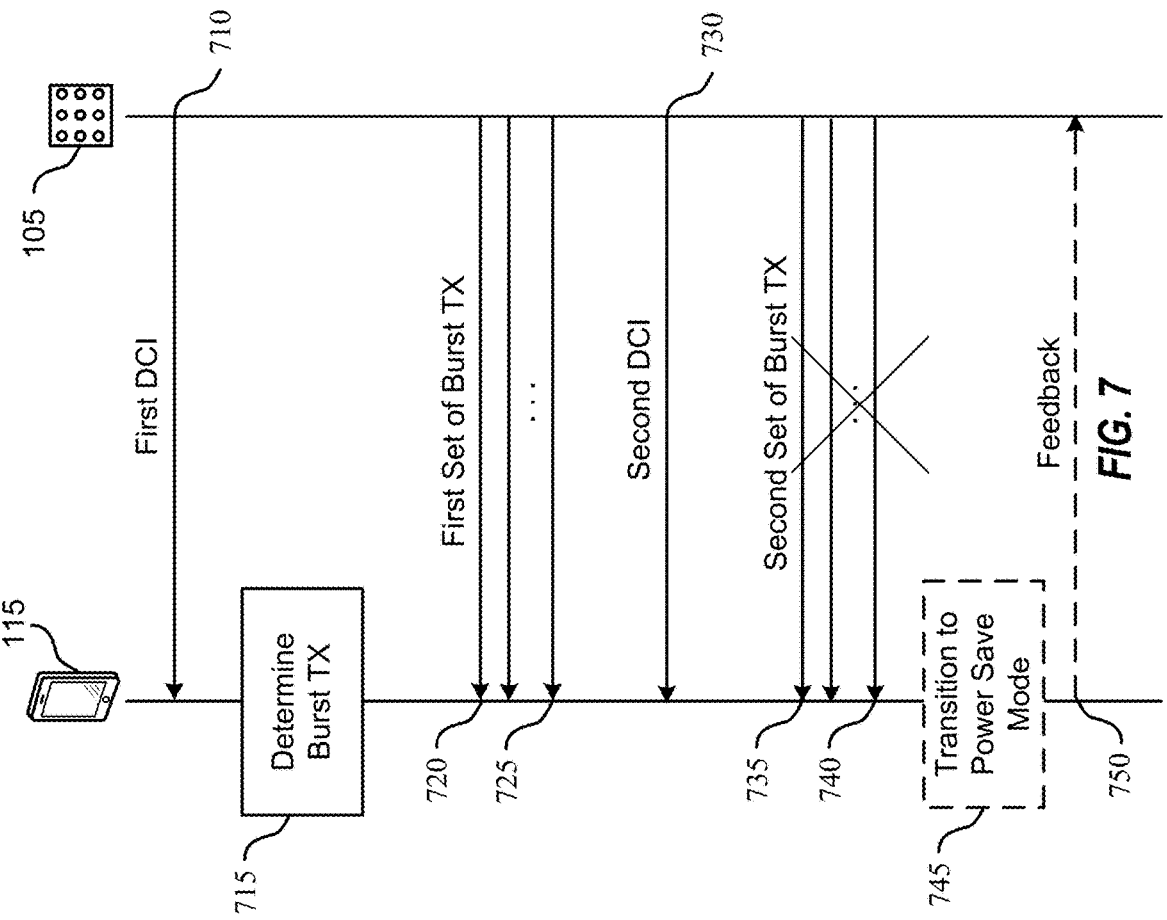
FIG. 7 is a timing diagram illustrating another example wireless communication system that supports enhanced burst transmission operations according to one or more aspects.

Referring to FIG. 7, FIG. 7 is a diagram 700 of enhanced burst transmission operations. Although the example illustrated in FIG. 7 depicts a single network device and a single UE, in other implementations, the operations may occur between other wireless communication devices, such as vehicle UEs, base stations, IoT devices, etc., and the network may include multiples of such devices. As compared to the example of FIG. 5 which illustrates single signaling message operations, the example of FIG. 7 illustrates multiple signaling message operations. Additionally, as compared to the example of FIG. 6 which illustrates an additional signaling message to schedule a subsequent set of the burst transmission, the example of FIG. 7 illustrates an additional signaling message to cancel a subsequent set or sets of the burst transmission and/or indicate a last set of the burst transmission.

At 710, the base station 105 transmits a first signaling message, such as a burst transmission signaling message. For example, the base station 105 transmits a first DCI to the UE 115 which indicates a burst transmission. As other examples, the base station 105 transmits a MAC-CE or RRC message to the UE 115 which indicates a burst transmission. The first signaling message may include or provide a burst transmission indication. In some implementations, the message includes a burst transmission indication, such as an explicit indication in dedicated field. In other implementations, the first signaling message implicitly indicates the burst transmission indication by reusing an existing or legacy field.

Additionally, the signaling message may include or indicate a power savings indication. For example, the signaling message may indicate to transition to a sleep mode as described herein.

In a particular implementation, the base station 105 transmits a burst transmission configuration message prior to the first signaling message. In some such implementations, the configuration for the UE is explicitly provided. This configuration may be explicitly indicate to go to sleep mode after multi-PDSCH reception or multi-PUSCH transmission. When no burst transmission configuration message is used, the burst transmission operations may be referred to as implicit, such as implicit indication to sleep mode using an offset to indicate multiple sets of multi-PDSCH/multi-PUSCH.

At 715, the UE 115 receives and decodes the first signaling message. The UE 115 may decode the first signaling message to determine the burst transmission indication, and may determine the burst transmission based on the burst transmission indication. For example, the UE 115 may determine that a first set of the burst transmission is scheduled by the first signaling message. As another example, the UE 115 may determine that multiple sets (e.g., a first set and a second set) of the burst transmission are scheduled by the first signaling message.

From 720 to 725, the base station 105 transmits the first set of the burst transmission. For example, the base station 105 transmits a first set of PDSCH transmissions (e.g., 8 PDSCHs in the example of FIG. 7) to the UE 115 based on the indication of the first signaling message. The first signaling message schedules the first set of PDSCH transmissions.

The UE 115 may receive and decode the first set of the burst transmission. For example, the UE 115 may monitor resources associated with the first set of the burst transmission based on the first signaling message which scheduled the first set of PDSCH transmissions. The UE 115 may successful receive and decode each PDSCH transmission of the first set. As another example, the UE 115 may determine that multiple sets (e.g., a first set and a second set) of the burst transmission are scheduled by the first signaling message.

Additionally, the UE 115 may determine a power savings indication based on the signaling message. For example, the UE 115 may determine a sleep mode indication based on the signaling message, such as based on the indicator for multiple sets of transmissions or based on another (e.g., dedicated) indicator. The power savings indication and modes or settings there may include an indication for power modes between sets of the burst transmission, for power modes after an end of the burst transmission (e.g., last set thereof), or both.

At 725, the UE 115 optionally determines to transition to a power savings mode. For example, the UE 115 determines that the first set of the burst transmission is not a last set of the burst transmission based on the first signaling message. Although this determination is illustrated at 725 in FIG. 7 this is for illustrative purposes, the determination may be made prior to 725 and the end of the first set in other implementations.

At 725, the UE 115 optionally transitions to a power savings mode based on the determination. For example, the UE 115 transitions to a power savings mode (e.g., low power or sleep mode) based on the determination, which was made based on the first signaling message. Although this transition is illustrated at 725 in FIG. 7, the transition may be made after 725 and the end of the first set in other implementations. To illustrate, the UE 115 may send a power savings signaling message prior to transitioning to the power saving mode in some such implementations. For example, the UE 115 sends a sleep mode indication message to the base station 105.

At or before 730, the UE 115 optionally transitions out of the power savings mode. For example, in such implementations where the UE 115 transitioned to the power savings mode, the determines to transition out of the power savings mode based on the first signaling message. To illustrate, the UE 115 may wake from a sleep mode based on a timer or time set based on the first signaling message and independent of an inactivity timer (e.g., CDRX inactivity timer).

At 730, the base station 105 transmits a second signaling message, such as a second burst transmission signaling message. For example, the base station 105 transmits a second DCI to the UE 115 which cancels the second set of the burst transmission indicated by the first DCI. As other examples, the base station 105 transmits a MAC-CE or RRC message to the UE 115 which cancels the second set of the burst transmission. The second signaling message may cancel or otherwise indicate an end of the burst transmission in some implementations. In a particular implementation, the second signaling message cancels multiple sets of the burst transmission (e.g., the second set and a third set not shown in FIG. 7) which were originally indicated (and optionally scheduled) by the first signaling message.

The second signaling message (e.g., cancellation or non-scheduling message) of FIG. 7 may be used with the operations in FIG. 5 or 6. That is, the cancellation or non-scheduling message signaling message may be used with a signaling message as in FIG. 5 which schedules multiple sets of transmissions of the burst transmission. Additionally, the cancellation or non-scheduling message signaling message may be used with multiple signaling messages as in FIG. 6 which each schedule a corresponding set of transmissions of the burst transmission. The second signaling message may provide additional flexibility the cost of some additional minor overhead and power consumption as compared to the single signaling message operations of FIG. 5.

The UE 115 receives and decodes the second signaling message. The UE 115 may decode the second signaling message to determine the amount of PDSCHs in the second set and/or whether the second set of the burst transmission is a last set of the burst transmission.

At 730, the UE 115 determines the burst transmission has completed. For example, the UE 115 determines that the first set of the burst transmission was a last set of the burst transmission based on the second signaling message or that the second set (and optionally other subsequent sets) are canceled. Although this determination is illustrated at 735 in FIG. 7 this is for illustrative purposes, the determination may be made prior to 735. The UE 115 may refrain from monitoring resources associated with the second set of the burst transmission based on the second signaling message which canceled the second set of PDSCH transmissions or otherwise indicated the burst transmission has completed.

At 735, the base station 105 refrains from transmitting the second set of the burst transmission. For example, the base station 105 refrains from transmitting a second set of PDSCH transmissions to the UE 115 based on the indication of the second signaling message. The second signaling message cancels or refrains from scheduling the second set of PDSCH transmissions in the example of FIG. 7.

After 730, the UE 115 determines to transition to a power savings mode. For example, the UE 115 determines that the second set of the burst transmission is canceled or that the first set of the burst transmission was a last set of the burst transmission based on the second signaling message and that the burst transmission has ended based on the second signaling message. The UE 115 may determine to enter the power savings mode based on the second signaling message. Although this determination is discussed after the canceled transmission, the determination may be made at or after 730 and the second signaling message in other implementations.

At 745, the UE 115 transitions to the power savings mode. For example, the UE 115 transitions to the power savings mode after reception of the second set and based on the determination, which was made based on the second signaling message. Although this transition is illustrated at 745 in FIG. 7, the transition may be made after 730 and the cancelation of the second set in other implementations. To illustrate, the UE 115 may transition to a power save mode after 730 and prior to any canceled transmission at 735. As another example, transition may occur after transmitting an indication to the network. To illustrate, the UE 115 may send a power savings signaling message prior to transitioning to the power saving mode in some such implementations. For example, the UE 115 sends a sleep mode indication message to the base station 105.

The power savings mode may include any reduced power mode or low power mode as described herein. In some implementations, the power savings mode is a sleep mode. In a particular implementation, such as where the UE 115 has multiple levels of sleep mode (e.g., light and deep sleep), the UE 115 may enter into one particular sleep mode (e.g., deep sleep) after the end of the burst transmission and may enter into another particular sleep mode (e.g., light sleep mode) between sets of the burst transmission. Alternatively, the UE 115 may transition into other low power modes between sets and after a last set of the burst transmission.

At 750, the UE 115 optionally transmits feedback information to the base station 105. For example, the UE 115 transmits an acknowledge message (e.g., HARQ ACK feedback message) for the burst transmission, such as ACK or NACK bits for the first and second sets of transmissions. To illustrate, the UE 115 may transmit a single message for the feedback for the burst transmission, as illustrated in the example of FIG. 7, or multiple messages for the feedback for the burst transmission. In some implementations where multiple messages are used to provide feedback, the UE 115 may transmit one message indicating feedback for a portion of the burst transmission, such as for one or more sets of transmission of the burst transmission, and such message may be transmitted before other subsequent sets of transmissions, such as prior to 735. Additionally, the UE 115 may transmit a feedback message prior to going to the power save mode (e.g., sleep mode) at 745. Alternatively, the UE 115 may transmit the feedback message or messages after going to the power save mode (e.g., sleep mode) as in the example of FIG. 7. Although described with reference to uplink operations, feedback may be provided for downlink operations as in FIGS. 5-7.

Thus, in the example in FIG. 7, the wireless communication devices perform enhanced burst transmission operations by utilizing multiple signaling message. That is, the burst transmission may include more than one set of transmissions (e.g., multiple multi-set PDSCH transmissions) and such additional sets of the burst transmission may be scheduled by additional signaling messages for additional flexibility. Additionally, power savings operations for the burst transmission operations may also be signaled by the signaling messages. Specifically, the power savings operations may be implicitly indicated by the signaling messages also or explicitly indicated/configured by a prior RRC message and by the signaling messages. As described herein, the power savings operations enable enhancements over prior time based sleep mode operations (e.g., CDRX).

Figure 8:
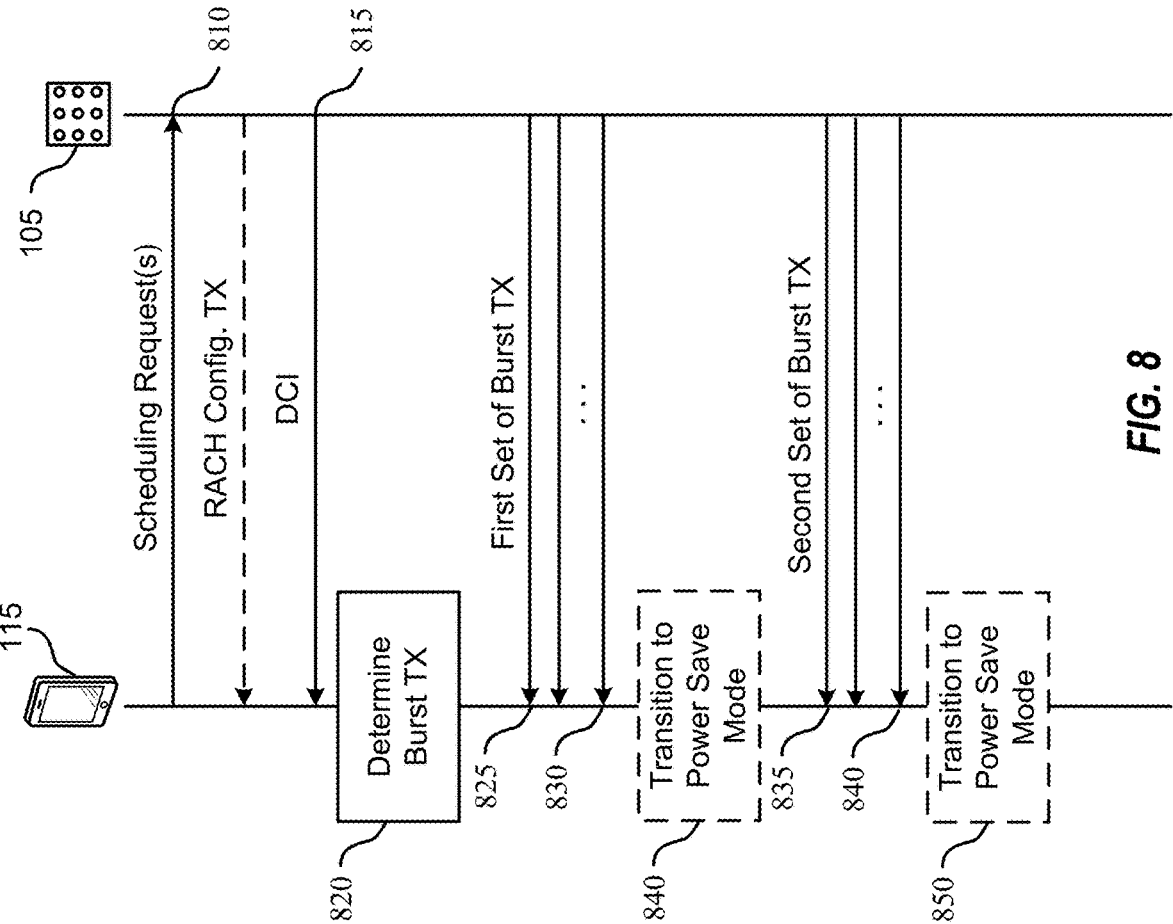
FIG. 8 is a timing diagram illustrating another example wireless communication system that supports enhanced burst transmission operations according to one or more aspects.

Referring to FIG. 8, FIG. 8 is a diagram 800 of enhanced burst transmission operations. Although the example illustrated in FIG. 8 depicts a single network device and a single UE, in other implementations, the operations may occur between other wireless communication devices, such as vehicle UEs, base stations, IoT devices, etc., and the network may include multiples of such devices. As compared to the example of FIG. 5 which illustrates downlink (e.g., PDSCH) operations, the example of FIG. 8 illustrates uplink (e.g., PUSCH) operations. Additionally, as compared to the examples of FIGS. 6 and 7 which illustrates multiple signaling message operations, the example of FIG. 8 illustrates single signaling message operations. In other implementations, the uplink (e.g., PUSCH) operations of FIG. 8 may use multiple signaling messages as in FIGS. 6 and 7.

At 810, the UE 115 optionally transmits one or more scheduling request messages. For example, the UE 115 transmits a UCI to the base station 105 which requests one or more uplink transmission resources. In some implementations, the scheduling request messages indicates or requests a burst transmission. In other implementations, the UE 115 may transmit multiple scheduling requests (e.g., no burst transmission requests or XR traffic/application requests) and the base station 105 may determine that an uplink burst transmission or transmission may improve efficiency and power savings.

Optionally, such after or prior to 815, the base station 105 may transmit a burst transmission configuration message. For example, a base station transmits a RRC configuration message, such as 450 or 460, to indicate sleep mode settings for burst transmissions, such as between or after multi-PDSCH reception or multi-PUSCH transmission. To illustrate, the configuration message may include or indicate a configuration of a particular IE (e.g., offafterMultiPUSCH). This configuration or parameter (e.g., IE) may be used and may be tied to the mechanism of burst transmissions (e.g., multi-PDSCH/PUSCH reception/transmission) through the signaling message (e.g., PUCCH or DCI) bits that enable the burst reception/transmission. When the RRC configuration for burst transmission is enabled or configured, the devices may use no additional signaling and/or no additional downlink bits (e.g., DCI bits) to indicate sleep mode between sets of a burst transmission and/or after completion of a burst transmission.

At 815, the base station 105 transmits a signaling message, such as a burst transmission signaling message. For example, the base station 105 (e.g., a portion thereof) transmits a DCI to the UE 115 which indicates a burst transmission. As other examples, the base station 105 (e.g., a portion thereof) transmits a MAC-CE or RRC message to the UE 115 which indicates a burst transmission. The signaling message may include or provide a burst transmission indication. In some implementations, the message includes a burst transmission indication, such as an explicit indication in dedicated field. In other implementations, the signaling message implicitly indicates the burst transmission indication by reusing an existing or legacy field.

Additionally, the signaling message may include or indicate a power savings indication. For example, the signaling message may indicate to transition to a sleep mode as described herein.

In a particular implementation, the base station 105 transmits a burst transmission configuration message prior to the signaling message. In some such implementations, the configuration for the UE is explicitly provided. This configuration may be explicitly indicate to go to sleep mode after multi-PDSCH reception or multi-PUSCH transmission. When no burst transmission configuration message is used, the burst transmission operations may be referred to as implicit, such as implicit indication to sleep mode using an offset to indicate multiple sets of multi-PDSCH/multi-PUSCH.

At 820, the UE 115 receives and decodes the signaling message. The UE 115 may decode the signaling message to determine the burst transmission indication, and may determine the burst transmission based on the burst transmission indication. For example, the UE 115 may determine that a first set of transmissions of the burst transmission is scheduled by the signaling message. As another example, the UE 115 may determine that multiple sets (e.g., a first set and a second set) of the burst transmission are scheduled by the signaling message.

Additionally, the UE 115 may determine a power savings indication based on the signaling message. For example, the UE 115 may determine a sleep mode indication based on the signaling message, such as based on the indicator for multiple sets of transmissions or based on another (e.g., dedicated) indicator. The power savings indication and modes or settings there may include an indication for power modes between sets of the burst transmission, for power modes after an end of the burst transmission (e.g., last set thereof), or both.

From 825 to 830, the UE 115 transmits the first set of transmissions of the burst transmission. For example, the UE 115 transmits a first set of PUSCH transmissions (e.g., 8 PUSCHs in the example of FIG. 8) to the base station 105 based on the indication of the signaling message. The signaling message schedules the first set of PUSCH transmissions. As another example, the UE 115 may determine that multiple sets (e.g., a first set and a second set) of the burst transmission are scheduled by the signaling message.

The base station 105 may receive and decode the first set of transmissions of the burst transmission. For example, the base station 105 may monitor resources associated with the first set of the burst transmission based on the signaling message which scheduled the first set of PUSCH transmissions. The base station 105 may successful receive and decode each PUSCH transmission of the first set.

At 840, the UE 115 optionally determines to transition to a power savings mode. For example, the UE 115 determines that the first set of the burst transmission is not a last set of the burst transmission based on the signaling message. Although this determination is illustrated at 840 in FIG. 8 this is for illustrative purposes, the determination may be made prior to 840 and the end of the first set in other implementations, such as at or after 820.

At 840, the UE 115 optionally transitions to a power savings mode based on the determination. For example, the UE 115 transitions to a power savings mode (e.g., low power or sleep mode) based on the determination, which was made based on the signaling message. Although this transition is illustrated at 840 in FIG. 8, the transition may be made at or after 830 and the end of the first set of transmissions in other implementations. To illustrate, the UE 115 may send a power savings signaling message prior to transitioning to the power saving mode in some such implementations. For example, the UE 115 sends a sleep mode indication message to the base station 105.

At or before 835, the UE 115 optionally transitions out of the power savings mode. For example, in such implementations where the UE 115 transitioned to the power savings mode, the determines to transition out of the power savings mode based on the signaling message. To illustrate, the UE 115 may wake from a sleep mode based on a timer or time set based on the signaling message and independent of an inactivity timer (e.g., CDRX inactivity timer).

From 835 to 840, the UE 115 transmits the second set of transmissions of the burst transmission. For example, the UE 115 transmits a second set of PUSCH transmissions (e.g., 6 PUSCHs in the example of FIG. 8) to the base station 105 based on the indication of the signaling message. The signaling message schedules the second set of PUSCH transmissions in the example of FIG. 8. As another example, the UE 115 may determine that other additional sets (e.g., a third set) of the burst transmission are scheduled by the signaling message.

The base station 105 may receive and decode the second set of transmissions of the burst transmission. For example, the base station 105 may monitor resources associated with the second set of the burst transmission based on the signaling message which scheduled the second set of PUSCH transmissions. The base station 105 may successful receive and decode each PUSCH transmission of the second set.

At 840, the UE 115 determines the burst transmission has completed. For example, the UE 115 determines that the second set of transmissions of the burst transmission is a last set of transmissions of the burst transmission based on the signaling message and that the burst transmission has ended based on the signaling message. Although this determination is illustrated at 840 in FIG. 8 this is for illustrative purposes, the determination may be made prior to 840 and the end of the second set in other implementations.

At 850, the UE 115 determines to transition to a power savings mode. For example, the UE 115 determines that the second set of the burst transmission is a last set of the burst transmission based on the signaling message and that the burst transmission has ended based on the signaling message. The UE 115 may determine to enter the power savings mode based on the signaling message. Although this determination is illustrated at 850 in FIG. 8 this is for illustrative purposes, the determination may be made prior to 850 and the end of the second set in other implementations, such as at or after 820.

At 850, the UE 115 transitions to the power savings mode. For example, the UE 115 transitions to the power savings mode after reception of the second set and based on the determination, which was made based on the signaling message. Although this transition is illustrated at 840 in FIG. 8, the transition may be made after 840 and the end of the second set in other implementations. To illustrate, the UE 115 may send a power savings signaling message prior to transitioning to the power saving mode in some such implementations. For example, the UE 115 sends a sleep mode indication message to the base station 105.

The power savings mode may include any reduced power mode or low power mode as described herein. In some implementations, the power savings mode is a sleep mode. In a particular implementation, such as where the UE 115 has multiple levels of sleep mode (e.g., light and deep sleep), the UE 115 may enter into one particular sleep mode (e.g., deep sleep) after the end of the burst transmission and may enter into another particular sleep mode (e.g., light sleep mode) between sets of the burst transmission. Alternatively, the UE 115 may transition into other low power modes between sets and after a last set of the burst transmission.

Thus, in the example in FIG. 8, the wireless communication devices perform enhanced burst transmission operations by utilizing a single signaling message. That is, the burst transmission may include more than one set of transmissions (e.g., multiple multi-set PUSCH transmissions) and all such transmission may be scheduled by a single signaling message for lower signaling overhead and increased throughput. Additionally, power savings operations for the burst transmission operations may also be signaled by the single signaling message. Specifically, the power savings operations may be implicitly indicated by the signaling message also or explicitly indicated/configured by a prior RRC message and by the signaling message. As described herein, the power savings operations enable enhancements over prior time based sleep mode operations (e.g., CDRX).

Although not illustrated in the examples in FIGS. 5-8 for clarity, but the devices of FIGS. 5-8 may perform additional legacy and/or standards based operations in addition to the operations illustrated and described in FIGS. 5-8. For example, the devices may perform RACH operations to setup a connection, RRC configuration to establish and/or configure parameters, perform XR operations, perform feedback operations (e.g., HARQ), perform power saving operations (e.g., legacy power saving operations in addition to the one described herein and/or modified legacy power saving operations, such as CDRX or modified CDRX operations). Such examples processes are illustrative, and not a complete list.

Although the examples in FIGS. 5-7 describe and/or illustrate the burst transmissions as in terms of downlink transmissions and PDSCHs, in other implementations, such as illustrated in FIG. 8, the burst transmission may be used in other communication types, such as uplink transmissions and includes one or more sets of PUSCHs.

Although the examples in FIGS. 5-8 describe and/or illustrate the burst transmissions as having two sets of transmissions (e.g., two sets of multiple PDSCHs or PUSCHs), in other implementations the burst transmission may have one set of multiple transmissions or more than two sets of multiple transmissions.

Although the examples in FIGS. 5-8 describe and/or illustrate the signaling messages as DCIs, in other implementations RRC message may be used or MAC-CE indications may be used. Additionally, in some such implementations, multiple type of messages may be used. For example, one message type (e.g., a DCI) may be used to indicate, setup, or schedule a burst transmission and another message type (e.g., a MAC-CE) may be used to adjust, cancel, or schedule future sets of the burst transmission.

Additionally, or alternatively, one or more operations of FIGS. 3-8 may be added, removed, substituted in other implementations. For example, in some implementations, one or more of the example steps of FIGS. 5 and 8 may be used together. To illustrate, a downlink burst transmissions of FIG. 5 may be used with uplink burst transmissions of FIG. 8. As another illustration, additional signaling (e.g., per set signaling) of FIG. 6 may be used with cancel signaling or feedback signaling of FIG. 7. As yet another illustration, additional signaling (e.g., per set signaling) of FIGS. 4, 6, and 7 may be used with the operations of FIG. 8 (e.g., PUSCH, scheduling requests, and/or RRC configuration).

Figure 11:
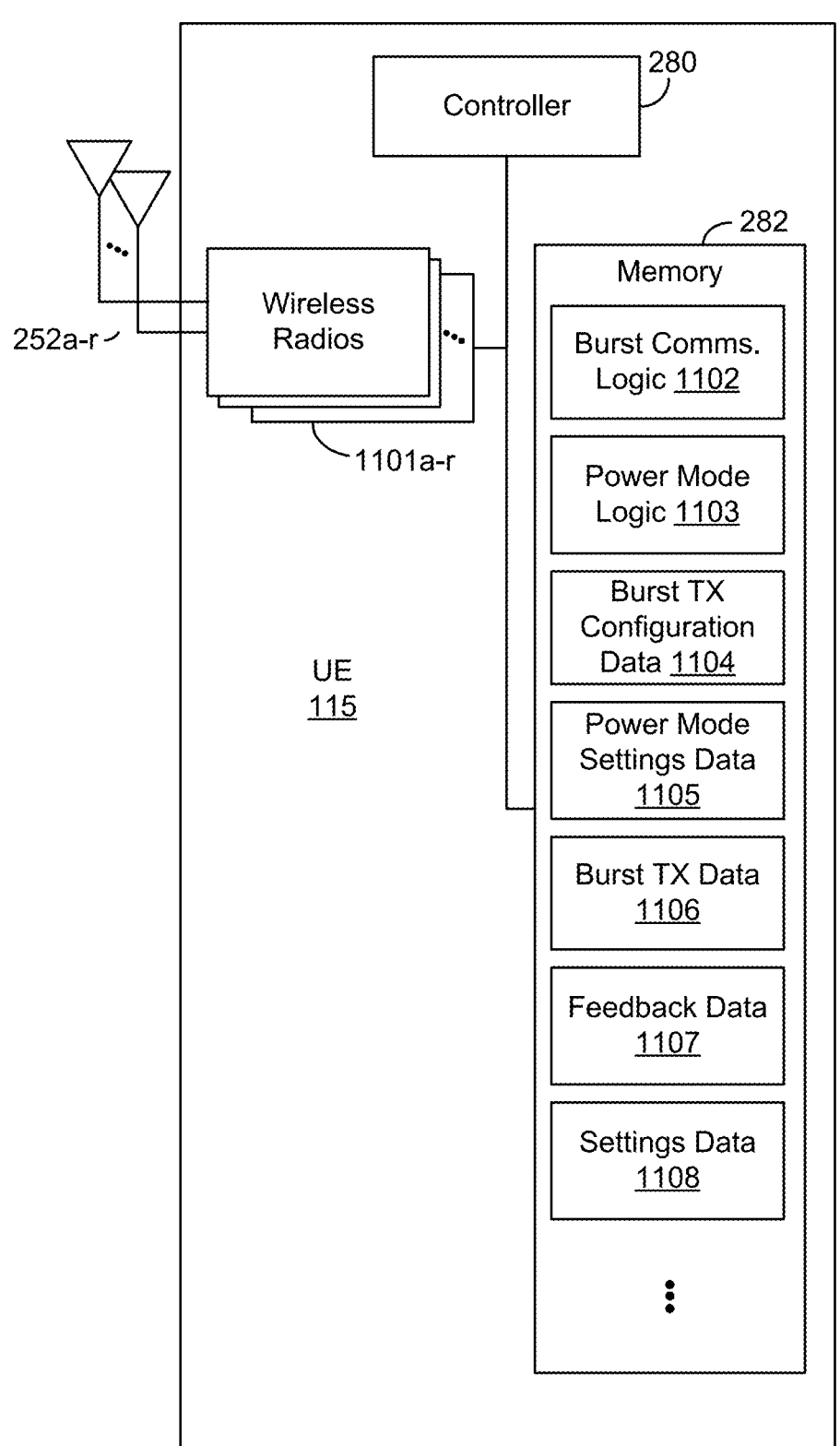
FIG. 11 is a block diagram of an example UE that supports enhanced burst transmission operations according to one or more aspects.

FIG. 9 is a flow diagram illustrating example blocks executed by a wireless communication device (e.g., a UE or base station) configured according to an aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1101a-r and antennas 252a-r. Wireless radios 1101a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 11, memory 282 stores burst communications logic 1102, power mode logic 1103, burst transmission configuration data 1104, power mode settings data 1105, burst transmission data 1106, feedback data 1107, and settings data 1108. The data (1102-1108) stored in the memory 282 may include or correspond to the data (406, 408, 442, 444) stored in the memory 404 of FIG. 4.

At block 900, a wireless communication device, such as a UE, receives a signaling message indicating a burst transmission, the burst transmission including one or more sets of PDSCH or PUSCH transmissions. For example, the UE 115 receives the configuration transmission 450 of FIG. 4, the signaling message 452 of FIG. 4, the signaling messages of FIGS. 5-8, or the RACH configuration transmission of FIG. 8, as described with reference to FIGS. 4-8. To illustrate, a receiver (e.g., receive processor 258 or receiver 412) of the UE 115 receives the signaling message 452, including the burst transmission settings data 406, via wireless radios 1101a-r and antennas 252a-r. The signaling message 452 may include or correspond to DCI, a MAC-CE, or RRC transmission, as described with reference to FIGS. 4-8. The UE 115 may determine burst transmission timing information and power savings information based on the signaling message 452, as described herein.

At block 901, the UE 115 transmits or receives at least one set of PDSCH or PUSCH transmissions of the one or more sets of PDSCH or PUSCH transmissions of the burst transmission based on the signaling message. For example, the UE 115 transmits or receives the transmissions 454, 456, or both of FIG. 4 to or from the base station 105, as described with reference to FIG. 4. As another example, the UE 115 transmits or receives the sets of PDSCH or PUSCH transmissions (e.g., PDSCHs or PUSCHs) of the burst transmission to or from the base station 105, as described with reference to FIGS. 5-8. To illustrate, a receiver (e.g., receive processor 258 or receiver 412) of the UE 115 receives the multiple PDSCH transmissions via wireless radios 1101a-r and antennas 252a-r while monitoring for a first set of PDSCH or PUSCH transmissions of the burst transmission scheduled by the signaling message.

At block 902, the UE 115 transitions to a power saving mode based on the signaling message. For example, the UE 115 transitions to a power savings mode after a last set of PDSCH or PUSCH transmissions (e.g., second set) of the burst transmission, as described with reference to FIGS. 4-8. As another example, the UE 115 transitions to a power savings mode between sets of PDSCH or PUSCH transmissions (e.g., first and second set) of the burst transmission, as described with reference to FIGS. 4-8. To illustrate, the power mode manager 416 (or power mode logic 1103) of the UE 115 may enter a power savings mode, such as switch off one or more components, such as processors, filters, wireless radios 1101a-r, antennas 252a-r, etc. In some implementations, the UE 115 may transition to a first power savings mode in between sets of the transmissions of the burst transmission and a second power savings mode after a last set of PDSCH or PUSCH transmissions of the burst transmission.

The wireless communication device (e.g., UE or base station) may execute additional blocks (or the wireless communication device may be configured further perform additional operations) in other implementations. For example, the wireless communication device (e.g., the UE 115) may perform one or more operations described above. As another example, the wireless communication device (e.g., the UE 115) may perform one or more aspects as presented below.

In a first aspect, transitioning to the power saving mode includes: the UE 115 transitioning to the power savings mode after an end of the burst transmission based on the signaling message, where the power savings mode is a low power mode, a sleep mode, a light sleep mode, a deep sleep mode, or a power mode with a lower power consumption than the current mode.

In a second aspect, alone or in combination with the first aspect, transitioning to the power saving mode includes: the UE 115 transitioning to a sleep mode immediately after a last set of PDSCH or PUSCH transmissions of the one or more sets of PDSCH or PUSCH transmissions of the burst transmission based on the signaling message.

In a third aspect, alone or in combination with one or more of the above aspects, transmitting the at least one set of PDSCH or PUSCH transmissions includes the UE 115: transmitting or receiving a first set of PDSCH or PUSCH transmissions of the one or more sets of PDSCH or PUSCH transmissions of the burst transmission based on the signaling message; transitioning to a second power saving mode based on the signaling message after transmission or reception of the first set of PDSCH or PUSCH transmissions; transmitting or receiving a second set of PDSCH or PUSCH transmissions of the one or more sets of PDSCH or PUSCH transmissions of the burst transmission based on the signaling message, and transitioning to the power saving mode includes the UE 115: transitioning to a sleep mode in between the transmission of the first set of PDSCH or PUSCH transmissions and the second set of PDSCH or PUSCH transmissions based on the signaling message.

In a fourth aspect, alone or in combination with one or more of the above aspects, the power save mode comprises a deep sleep mode and the second power save mode comprises a light sleep mode.

In a fifth aspect, alone or in combination with one or more of the above aspects, transmitting the at least one set of PDSCH or PUSCH transmissions includes the UE 115: transmitting or receiving a first set of PDSCH or PUSCH transmissions of the one or more sets of PDSCH or PUSCH transmissions of the burst transmission based on the signaling message; and transmitting or receiving a second set of PDSCH or PUSCH transmissions of the one or more sets of PDSCH or PUSCH transmissions of the burst transmission based on the signaling message, and transitioning to the power saving mode includes the UE 115 transitioning to a sleep mode in between the transmission of the first set of PDSCH or PUSCH transmissions and the second set of PDSCH or PUSCH transmissions based on the signaling message.

In a sixth aspect, alone or in combination with one or more of the above aspects, the UE 115 further transmitting a power save mode indication prior to transitioning to the power save mode.

In a seventh aspect, alone or in combination with one or more of the above aspects, transmitting the power save mode indication includes the UE 115: transmitting a sleep mode indication after transmission or reception of a first set of PDSCH or PUSCH transmissions of the one or more sets of PDSCH or PUSCH transmissions of the burst transmission; or transmitting a sleep mode indication after transmission or reception of a last set of PDSCH or PUSCH transmissions of the one or more sets of PDSCH or PUSCH transmissions of the burst transmission.

In an eighth aspect, alone or in combination with one or more of the above aspects, the UE 115 further: determines a number of PDSCH/PUSCHs transmissions of the burst transmission based on the signaling message; and determines to refrain from transitioning to a sleep mode immediately after a first set of PDSCH/PUSCHs of the burst transmission based on the signaling message and to transition to a sleep mode immediately after a last set of PDSCH/PUSCHs.

In a ninth aspect, alone or in combination with one or more of the above aspects, the UE 115 further: determining a number of sets of PDSCH or PUSCH transmissions of the one or more sets of PDSCH or PUSCH transmissions of the burst transmission based on the signaling message; and determining to refrain from transitioning to a sleep mode immediately after a first set of PDSCH or PUSCH transmissions of the one or more sets of PDSCH or PUSCH transmissions based on the signaling message and to transition to a sleep mode immediately after a last set of PDSCH or PUSCH transmissions of the one or more sets of PDSCH or PUSCH transmissions.

In a tenth aspect, alone or in combination with one or more of the above aspects, the signaling message indicates to postpone a low power or sleep mode after transmission or reception of the first set of PDSCH or PUSCH transmissions of the burst transmission.

In an eleventh aspect, alone or in combination with one or more of the above aspects, the signaling message schedules the first set of PDSCH or PUSCH transmissions of the burst transmission and indicates the second set of PDSCH or PUSCH transmissions of the burst transmission.

In a twelfth aspect, alone or in combination with one or more of the above aspects, the signaling message schedules the first set of PDSCH or PUSCH transmissions of the burst transmission and the second set of PDSCH or PUSCH transmissions of the burst transmission.

In a thirteenth aspect, alone or in combination with one or more of the above aspects, the signaling message comprises a DCI, an RRC, or a MAC-CE.

In a fourteenth aspect, alone or in combination with one or more of the above aspects, the signaling message comprises the DCI, and wherein the DCI is a 0_1 type, 1_0 type, or 1_1 type, or includes a time domain resource assignment (TDRA) field.

In a fifteenth aspect, alone or in combination with one or more of the above aspects, the TDRA field indicates the burst transmission.

In a sixteenth aspect, alone or in combination with one or more of the above aspects, the signaling message includes a field of a multiple set parameter (e.g., multiset or additionalset) that indicates a number of sets of PDSCH or PUSCH transmissions of the burst transmission.

In a seventeenth aspect, alone or in combination with one or more of the above aspects, the field of the multiple set parameter is a 1 bit field which indicates 1 set (e.g., no additional sets) or more than 1 set or which indicates to postpone a sleep mode or not.

In an eighteenth aspect, alone or in combination with one or more of the above aspects, the field of the multiple set parameter is a multiple bit field which indicates a number of sets of PDSCH or PUSCH transmissions of the one or more sets of the burst transmission or a number of sets of PDSCH or PUSCH transmissions to postpone a sleep mode.

In a nineteenth aspect, alone or in combination with one or more of the above aspects, the signaling message indicates or schedules the burst transmission over two time periods (e.g., frame, window or cycle), and wherein the signaling message indicates more PDSCH transmissions or PUSCH transmissions than can be scheduled by the signaling message (e.g., DCI) in one time period of the two time periods.

In a twentieth aspect, alone or in combination with one or more of the above aspects, the signaling message is a DCI, and the UE 115 further: monitors, after a first set of PDSCH or PUSCH transmissions of the one or more sets of PDSCH or PUSCH transmissions and before a second set of PDSCH or PUSCH transmissions of the one or more sets of PDSCH or PUSCH transmissions, for a second DCI based on the DCI; and receives the second DCI, the second DCI indicating configuration information, scheduling information, or both, for the second set of PDSCH or PUSCH transmissions of the one or more sets of PDSCH or PUSCH transmissions of the burst transmission.

In a twenty-first aspect, alone or in combination with one or more of the above aspects, the signaling message is a DCI, and the UE 115 further: monitors, after a second set of PDSCH or PUSCH transmissions of the one or more sets of PDSCH or PUSCH transmissions, for a second DCI based on the DCI; and receives the second DCI, the second DCI indicating that the burst transmission is finished (e.g., no third set, to transition to sleep mode, etc.).

In a twenty-second aspect, alone or in combination with one or more of the above aspects, the UE 115 further: receives a second signaling message scheduling a second burst transmission, the second burst transmission including a plurality of set of second transmissions; transmit or receives a first set of second transmissions of the second burst transmission based on the second signaling message; receives a third signaling message indicating that the second burst transmission is finished (that second or additional sets of the second burst transmission is/are canceled); refrains from transmitting or receiving a second set of second transmissions of the second burst transmission based on the third signaling message; and transitions to a power saving mode based on the third signaling message.

In a twenty-third aspect, alone or in combination with one or more of the above aspects, the UE 115 further: transmits or receives a third set of PDSCH or PUSCH transmissions of the one or more sets of PDSCH or PUSCH transmissions of the burst transmission based on the signaling message;

and transitions to a power saving mode immediately after the transmission or reception of the third set of PDSCH or PUSCH transmissions.

In a twenty-fourth aspect, alone or in combination with one or more of the above aspects, the UE 115 further receives a RRC configuration message for power savings after burst transmissions; and configures power save mode settings for multi-PDSCH reception operations, multi-PUSCH transmission operations, or both. Additionally, or alternatively, the UE 115 transmits or receives sets of PDSCH or PUSCH transmissions based on the RRC configuration message, transitions to a power save mode between sets of PDSCH or PUSCH transmissions, transitions to a power save mode after a last set of PDSCH or PUSCH transmissions, or a combination thereof, based on the RRC configuration message.

In a twenty-fifth aspect, alone or in combination with one or more of the above aspects, the UE 115 further: receives a RRC configuration message for power savings in between sets of PDSCH or PUSCH transmissions of burst transmissions; and configures power save mode settings for multi-PDSCH reception operations, multi-PUSCH transmission operations, or both. Additionally, or alternatively, the UE 115 transmits or receives sets of PDSCH or PUSCH transmissions based on the RRC configuration message, transitions to a power save mode between sets of PDSCH or PUSCH transmissions, transitions to a power save mode after a last set of PDSCH or PUSCH transmissions, or a combination thereof, based on the RRC configuration message.

In some such aspects, after configuration the power save mode settings, the UE 115 determines the burst transmission and the power indication further based on the power save mode settings. For example, the UE 115 may further receive one or more sets of PDSCH or PUSCH transmissions of the burst transmission based on the power save mode settings and may transition to the power save mode based on the power save mode settings, which were set or modified by the RRC configuration message. As an illustration, the UE 115 may determine a schedule of the transmissions and a particular sleep mode based on signaling message and the RRC configuration message.

In a twenty-sixth aspect, alone or in combination with one or more of the above aspects, the first set of PDSCH or PUSCH transmissions and the second set of PDSCH or PUSCH transmissions are received by the wireless communication device, and the UE 115 further: transmits an acknowledgement message indicating acknowledgment information for the first set and the second set after transitioning to the power savings mode.

In a twenty-seventh aspect, alone or in combination with one or more of the above aspects, the first set of PDSCH or PUSCH transmissions and the second set of PDSCH or PUSCH transmissions are received by the wireless communication device, and the UE 115 further: transmits a first acknowledgement message indicating first acknowledgment information for the first set; and transmits a second acknowledgement message indicating second acknowledgment information for the second set after transitioning to the power savings mode.

In another aspect, a method of wireless communication includes: receiving, by a wireless communication device, a signaling message indicating a burst transmission, the burst transmission including multiple sets of PDSCH or PUSCH transmissions; receiving, by the wireless communication device, a first set of PDSCH or PUSCH transmissions of the multiple sets of PDSCH or PUSCH transmissions of the burst transmission based on the signaling message; and receiving, by the wireless communication device, a second set of PDSCH or PUSCH transmissions of the multiple sets of PDSCH or PUSCH transmissions of the burst transmission based on the signaling message.

In another aspect, a method of wireless communication includes: receiving, by a wireless communication device, a signaling message indicating a burst transmission, the burst transmission including multiple sets of PDSCH or PUSCH transmissions; transmitting, by the wireless communication device, a first set of PDSCH or PUSCH transmissions of the multiple sets of PDSCH or PUSCH transmissions of the burst transmission based on the signaling message; and transmitting, by the wireless communication device, a second set of PDSCH or PUSCH transmissions of the multiple sets of PDSCH or PUSCH transmissions of the burst transmission based on the signaling message.

In yet another aspect, a method of wireless communication includes receiving, by a wireless communication device, a RRC configuration message for power savings after multi-PDSCH/multi-PUSCHs transmissions corresponding to a burst transmission.

In some such aspects, the RRC message configures sleep mode settings multi-PDSCH reception operations, multi-PUSCH transmission operations, or both, through DCI signaling. The IE may be tied to the mechanism of multi-PDSCH/PUSCH reception/transmission through the DCI bits that enable the burst reception/transmission.

In some such aspects, the RRC message indicates or configures an information element of offafterMultiPUSCH.

In some such aspects, the DCI has format of DCI 0_1, and the UE further transitions to a light sleep mode after the burst transmission based on the RRC message.

In some such aspects, the DCI has format of DCI 1_0 or DCI 1_1, and the UE further:

determines an end time of the burst transmission based on the RRC message; determines to transition to a sleep mode after the burst transmission based on the end time and the RRC message (e.g., the configuration offafter-MultiPDSCH); and transitions to a sleep mode at the end time independent of explicit sleep mode signaling in the DCI. (e.g., no additional DCI bits are configured to indicate sleep mode after burst reception).

In some such aspects, the UE further enters a sleep mode after reception of the burst transmission based on the RRC message and independent of explicit sleep mode signaling in the DCI.

Accordingly, wireless communication devices may perform enhanced burst transmission operations for wireless communication devices. By performing burst transmission operations power usage can be reduced while increasing throughput and reducing overhead and latency.

Figure 12:
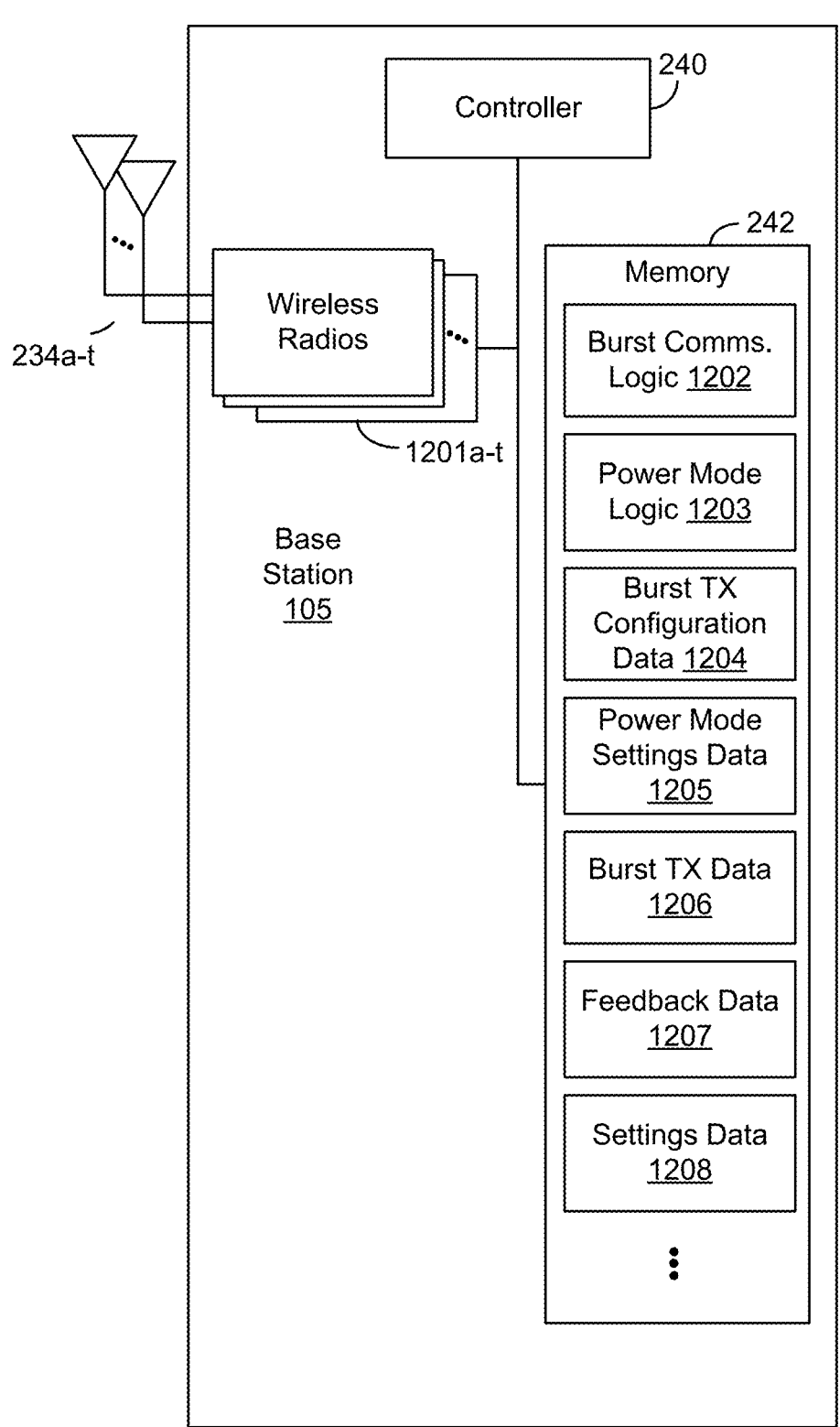
FIG. 12 is a block diagram of an example base station that supports enhanced burst transmission operations according to one or more aspects.

FIG. 10 is a flow diagram illustrating example blocks executed wireless communication device (e.g., a UE or network entity, such as a base station) configured according to an aspect of the present disclosure. The example blocks will also be described with respect to base station 105 as illustrated in FIG. 12. FIG. 12 is a block diagram illustrating base station 105 configured according to one aspect of the present disclosure. Base station 105 includes the structure, hardware, and components as illustrated for base station 105 of FIGS. 2 and/or 4. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1201a-t and antennas 234a-t. Wireless radios 1201a-t includes various components and hardware, as illustrated in FIG. 2 for base station 105, including modulator/demodulators 232a-r, MIMO detector 236, receive processor 238, transmit processor 220, and TX MIMO processor 230. As illustrated in the example of FIG. 12, memory 242 stores burst communications logic 1202, power mode logic 1203, burst transmission configuration data 1204, power mode settings data 1205, burst transmission data 1206, feedback data 1207, and settings data 1208. The data (1202-1208) stored in the memory 242 may include or correspond to the data (406, 408, 442, 444) stored in the memory 432 of FIG. 4.

At block 1000, a wireless communication device, such as a network device (e.g., a base station 105), transmits a signaling message indicating a burst transmission and indicating a power save mode associated with the burst transmission, the burst transmission including one or more sets of PDSCH or PUSCH transmissions. For example, the base station 105 transmits the configuration transmission 450 of FIG. 4, the signaling message 452 of FIG. 4, the signaling messages of FIGS. 5-8, or the RACH configuration transmission of FIG. 8, as described with reference to FIGS. 4-8. To illustrate, a transmitter (e.g., transmit processor 220/TX MIMO processor 230 or transmitter 434) of the base station 105 transmits the signaling message 452, including the burst transmission settings data 406, via wireless radios 1201a-t and antennas 234a-t for completing a two-step RACH procedure.

At block 1001, the wireless communication device transmits or receives at least one set of PDSCH or PUSCH transmissions of the one or more sets of PDSCH or PUSCH transmissions of the burst transmission based on the signaling message. For example, the base station 105 transmits or receives the transmissions 454, 456, or both of FIG. 4 to or from the UE 115, as described with reference to FIG. 4. As another example, the base station 105 transmits or receives the sets of PDSCH or PUSCH transmissions (e.g., PDSCHs or PUSCHs) of the burst transmission to or from the UE 115, as described with reference to FIGS. 5-8. To illustrate, a transmitter (e.g., transmit processor 220/TX MIMO processor 230 or transmitter 434) of the base station 105 transmits multiple PDSCH transmissions, via wireless radios 1201a-t and antennas 234a-t for transmitting a set of the burst transmission. The transmitter may also transmit other sets of multiple PDSCH transmissions of the burst transmission, as described with reference to FIGS. 4-8. The base station 105 indicates a burst transmission in the signaling message, The signaling message may also include or indicate burst transmission timing information (e.g., schedule one or more sets of PDSCH or PUSCH transmissions of the burst transmission) and power savings information. The power savings information may indicate a power save mode or mode to use, adjustment to a current power save mode, or an indication to a configured parameter for power save operations for burst transmissions. For example, the signaling message may indicate to use a setting of a RRC configured burst setting parameter, such as configured by a RRC configuration message of FIG. 4 or 8.

The wireless communication device (e.g., such as a UE or base station) may execute additional blocks (or the wireless communication device may be configured further perform additional operations) in other implementations. For example, the wireless communication device may perform one or more operations described above. As another example, the wireless communication device may perform one or more aspects as described with reference to FIGS. 4-9.

In a first aspect, the base station 105 further: receives burst information from a core network; and determines to schedule a burst signaling message for a UE based on the burst information from the core network.

In a second aspect, alone or in combination with the first aspect, the base station 105 further: receives burst information from a UE; and determines to schedule a burst uplink transmission for the UE based on the burst information from the UE.

In a third aspect, alone or in combination with one or more of the above aspects, the base station 105 further: receives one or more scheduling requests from a UE; and determines (such as based on AI/ML) to schedule a burst uplink transmission for the UE based on the one or more scheduling requests from the UE.

In a fourth aspect, alone or in combination with one or more of the above aspects, the base station 105 further: transmits a RRC message to a UE to indicate burst transmission configuration settings; and receives an ACK responsive to the RRC message.

In a fifth aspect, alone or in combination with one or more of the above aspects, the base station 105 further: receives a message from a UE to indicate the UE is burst transmission capable.

In a sixth aspect, alone or in combination with one or more of the above aspects, the base station 105 further: receives an ACK responsive to the one or more sets of the burst transmission; and transmits a second signaling message to cancel a third set (e.g., as future planned set or sets) of the burst transmission ACK responsive to receiving the ACK.

Accordingly, wireless communication devices may perform enhanced burst transmission operations for wireless communication devices. By performing burst transmission operations power usage can be reduced while increasing throughput and reducing overhead and latency.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
receiving, by a wireless communication device, a signaling message indicating a burst transmission, the burst transmission including two or more non-contiguous sets of multiple physical downlink shared channel (PDSCH) or physical uplink shared channel (PUSCH) transmissions, and the signaling message including a multiple set parameter configured to indicate an amount of sets of the two or more non-contiguous sets;
transmitting or receiving, by the wireless communication device, at least one set of multiple PDSCH or PUSCH transmissions of the two or more non-contiguous sets of multiple PDSCH or PUSCH transmissions of the burst transmission based on the signaling message; and
transitioning, by the wireless communication device, to a power save mode based at least in part on the multiple set parameter of the signaling message.

2. The method of claim 1, wherein transitioning to the power save mode includes:
transitioning, by the wireless communication device, to the power save mode after an end of the burst transmission based on the signaling message, wherein the power save mode is a low power mode, a sleep mode, a light sleep mode, a deep sleep mode, or a power mode with a lower power consumption than a current power mode.

3. The method of claim 1, wherein transitioning to the power save mode includes:
transitioning, by the wireless communication device, to a sleep mode immediately after a last set of multiple PDSCH or PUSCH transmissions of the two or more non-contiguous sets of multiple PDSCH or PUSCH transmissions of the burst transmission based on the signaling message.

4. The method of claim 1, wherein transmitting the at least one set of multiple PDSCH or PUSCH transmissions includes:

transmitting or receiving, by the wireless communication device, a first set of multiple PDSCH or PUSCH transmissions of the two or more non-contiguous sets of multiple PDSCH or PUSCH transmissions of the burst transmission based on the signaling message;

transitioning, by the wireless communication device, to a second power save mode based on the signaling message after transmission or reception of the first set of multiple PDSCH or PUSCH transmissions; and transmitting or receiving, by the wireless communication device, a second set of multiple PDSCH or PUSCH transmissions of the two or more non-contiguous sets of multiple PDSCH or PUSCH transmissions of the burst transmission based on the signaling message; and wherein transitioning to the power save mode includes:

transitioning, by the wireless communication device, to a sleep mode after the transmission second set of multiple PDSCH or PUSCH transmissions based on the signaling message.

5. The method of claim 1, wherein transmitting the at least one set of PDSCH or PUSCH transmissions includes:

transmitting or receiving, by the wireless communication device, a first set of multiple PDSCH or PUSCH transmissions of the two or more non-contiguous sets of multiple PDSCH or PUSCH transmissions of the burst transmission based on the signaling message; and transmitting or receiving, by the wireless communication device, a second set of multiple PDSCH or PUSCH transmissions of the two or more non-contiguous sets of multiple PDSCH or PUSCH transmissions of the burst transmission based on the signaling message; and wherein transitioning to the power save mode includes:

transitioning, by the wireless communication device, to a sleep mode in between the transmission of the first set of multiple PDSCH or PUSCH transmissions and the transmission second set of multiple PDSCH or PUSCH transmissions based on the signaling message.

6. The method of claim 1, further comprising:

transmitting, by the wireless communication device, a power save mode indication prior to transitioning to the power save mode.

7. The method of claim 6, wherein transmitting the power save mode indication includes:

transmitting, by the wireless communication device, a sleep mode indication after transmission or reception of a first set of multiple PDSCH or PUSCH transmissions of the two or more non-contiguous sets of multiple PDSCH or PUSCH transmissions of the burst transmission; or transmitting, by the wireless communication device, a sleep mode indication after transmission or reception of a last set of multiple PDSCH or PUSCH transmissions of the two or more non-contiguous sets of multiple PDSCH or PUSCH transmissions of the burst transmission.

8. The method of claim 1, further comprising:

determining, by the wireless communication device, a number of sets of multiple PDSCH or PUSCH transmissions of the two or more non-contiguous sets of multiple PDSCH or PUSCH transmissions of the burst transmission based on the signaling message; and determining, by the wireless communication device, to refrain from transitioning to a sleep mode immediately after a first set of multiple PDSCH or PUSCH transmissions of the two or more non-contiguous sets of multiple PDSCH or PUSCH transmissions based on the signaling message and to transition to a sleep mode immediately after a last set of PDSCH or PUSCH transmissions of the two or more non-contiguous sets of multiple PDSCH or PUSCH transmissions.

9. The method of claim 1, wherein the signaling message indicates to postpone a low power or sleep mode after transmission or reception of a first set of multiple PDSCH or PUSCH transmissions of the two or more non-contiguous sets of multiple PDSCH or PUSCH transmissions of the burst transmission.

10. The method of claim 1, wherein the signaling message schedules a first set of multiple PDSCH or PUSCH transmissions of the two or more non-contiguous sets of multiple PDSCH or PUSCH transmissions of the burst transmission and indicates a second set of multiple PDSCH or PUSCH transmissions of the two or more non-contiguous sets of multiple PDSCH or PUSCH transmissions of the burst transmission.

11. The method of claim 1, wherein the signaling message schedules a first set of multiple PDSCH or PUSCH transmissions of the two or more non- contiguous sets of multiple PDSCH or PUSCH transmissions of the burst transmission and a second set of multiple PDSCH or PUSCH transmissions of the two or more non-contiguous sets of multiple PDSCH or PUSCH transmissions of the burst transmission.

12. An apparatus for wireless communication comprising:

a processor; and a memory coupled to the processor, the memory storing instructions which when executed by the processor cause the processor to:

receive a signaling message indicating a burst transmission, the burst transmission including two or more non-contiguous sets of multiple physical downlink shared channel (PDSCH) or physical uplink shared channel (PUSCH) transmissions, and the signaling message including a multiple set parameter configured to indicate an amount of sets of the two or more non-contiguous sets;

transmit or receive at least one set of multiple PDSCH or PUSCH transmissions of the two or more non-contiguous sets of multiple PDSCH or PUSCH transmissions of the burst transmission based on the signaling message; and transition to a power save mode based at least in part on the multiple set parameter of the signaling message.

13. The apparatus of claim 12, wherein the signaling message comprises a downlink control information (DCI), a radio resource control (RRC) message, or a (MAC-CE) message.

14. The apparatus of claim 13, wherein the signaling message comprises the DCI, and wherein the DCI is a 0_1 type, 1_0 type, or 1_1 type, or includes a time domain resource assignment (TDRA) field.

15. The apparatus of claim 14, wherein the TDRA field indicates the burst transmission.

16. The apparatus of claim 12, wherein the signaling message includes a field that indicates the multiple set parameter, and wherein the field for the multiple set parameter is a 1 bit field which indicates one set of multiple PDSCH or PUSCH transmissions or more than one set of multiple PDSCH or PUSCH transmissions, or indicates to postpone a sleep mode or not.

17. The apparatus of claim 12, wherein the signaling message includes a field that indicates the multiple set parameter, and wherein the field for the multiple set parameter is a multiple bit field which indicates a number of sets of multiple PDSCH or PUSCH transmissions of the two or more non-contiguous sets of the burst transmission or a number of sets of multiple PDSCH or PUSCH transmissions to postpone a sleep mode.

18. The apparatus of claim 12, wherein the signaling message indicates or schedules the burst transmission over two time periods, and wherein the signaling message indicates more PDSCH transmissions or PUSCH transmissions than can be scheduled by the signaling message in one time period of the two time periods.

19. The apparatus of claim 12, wherein the signaling message is a downlink control information (DCI), and wherein the instructions further cause the processor to:

monitor, after a first set of multiple PDSCH or PUSCH transmissions of the two or more non-contiguous sets of multiple PDSCH or PUSCH transmissions and before a second set of multiple PDSCH or PUSCH transmissions of the two or more non-contiguous sets of multiple PDSCH or PUSCH transmissions, for a second DCI based on the DCI; and receive the second DCI, the second DCI indicating configuration information, scheduling information, or both, for the second set of multiple PDSCH or PUSCH transmissions of the two or more non-contiguous sets of multiple PDSCH or PUSCH transmissions of the burst transmission.

20. The apparatus of claim 12, wherein the signaling message is a downlink control information (DCI), and wherein the instructions further cause the processor to:

monitor, after a second set of multiple PDSCH or PUSCH transmissions of the two or more non-contiguous sets of multiple PDSCH or PUSCH transmissions, for a second DCI based on the DCI; and receive the second DCI, the second DCI indicating that the burst transmission is finished.

21. The apparatus of claim 12, wherein the instructions further cause the processor to:

receive a radio resource control (RRC) configuration message for power save operations after burst transmissions; and configure power save mode settings for multiple PDSCH reception operations, multiple PUSCH transmission operations, or both, based on the RRC configuration message.

22. The apparatus of claim 12, wherein the instructions further cause the processor to:

receive a radio resource control (RRC) configuration message for power save operations in between sets of multiple PDSCH or PUSCH transmissions of burst transmissions; and configure power save mode settings for multiple PDSCH operations, multiple PUSCH transmission operations, or both, based on the RRC configuration message.

23. The apparatus of claim 12, wherein the multiple set parameter implicitly indicates the transition to the power save mode.

24. The apparatus of claim 12, the instructions further cause the processor to:

determine a time to transition to the power save mode, a type of the power save mode, or both, based on the multiple set parameter and based on RRC configuration information for burst transmission settings.

25. A method of wireless communication comprising:

transmitting, by a wireless communication device, a signaling message indicating a burst transmission and indicating a power save mode associated with the burst transmission, the burst transmission including two or more non-contiguous sets of multiple physical downlink shared channel (PDSCH) or physical uplink shared channel (PUSCH) transmissions, and the signaling message including a multiple set parameter configured to indicate an amount of sets of the two or more non-contiguous sets and to indicate a transition to the power save mode; and transmitting or receiving, by the wireless communication device, at least one set of multiple PDSCH or PUSCH transmissions of the two or more non-contiguous sets of multiple PDSCH or PUSCH transmissions of the burst transmission based on the signaling message.

26. The method of claim 25, further comprising:

receiving, by the wireless communication device, burst information from a UE; and determining, by the wireless communication device, to schedule a burst uplink transmission for the UE based on the burst information from the UE.

27. The method of claim 25, further comprising:

receiving, by the wireless communication device, one or more scheduling requests from a user equipment (UE); and determining, by the wireless communication device, to schedule a burst uplink transmission for the UE based on the one or more scheduling requests from the UE.

28. An apparatus for wireless communication comprising:

a processor; and a memory coupled to the processor, the memory storing instructions which when executed by the processor cause the processor to:

transmit a signaling message indicating a burst transmission and indicating a power save mode associated with the burst transmission, the burst transmission including two or more non-contiguous sets of multiple physical downlink shared channel (PDSCH) or physical uplink shared channel (PUSCH) transmissions, and the signaling message including a multiple set parameter configured to indicate an amount of sets of the two or more non-contiguous sets and to indicate a transition to the power save mode; and transmit or receive at least one set of multiple PDSCH or PUSCH transmissions of the two or more non-contiguous sets of multiple PDSCH or PUSCH transmissions of the burst transmission based on the signaling message.

29. The apparatus of claim 28, wherein the instructions further cause the processor to:

transmit a radio resource control (RRC) configuration message to a user equipment (UE) to indicate burst transmission configuration settings; and receive an acknowledgement responsive to the RRC configuration message.

30. The apparatus of claim 28, wherein the instructions further cause the processor to:

receive an acknowledgement responsive to the at least one set of multiple PDSCH or PUSCH transmissions of the two or more non-contiguous sets of multiple PDSCH or PUSCH transmissions of the burst transmission; and transmit a second signaling message to cancel a third set of the burst transmission responsive to receiving the acknowledgement.

* * * * *